United States Patent [19]

Grote et al.

[11] Patent Number: 5,489,824
[45] Date of Patent: *Feb. 6, 1996

[54] DEFLECTION SYSTEM WITH A CONTROLLED BEAM SPOT

[75] Inventors: Michael D. Grote, Mercerville; Jeffrey P. Johnson, Lawrenceville, both of N.J.; Dennis J. Bechis, Yardley, Pa.

[73] Assignee: RCA Thomson Licensing Corporation, Princeton, N.J.

[*] Notice: The term of this patent shall not extend beyond the expiration date of Pat. No. 5,028,850.

[21] Appl. No.: 197,081

[22] Filed: May 17, 1993

Related U.S. Application Data

[63] Continuation of Ser. No. 723,289, Jun. 28, 1991, abandoned, which is a continuation of Ser. No. 554,644, Jul. 19, 1990, Pat. No. 5,028,850.

[51] Int. Cl.$^6$ .................................................. H01J 29/56
[52] U.S. Cl. ............................................................ 315/371
[58] Field of Search ............................ 315/371, 368.28, 315/382, 382.1

[56] References Cited

U.S. PATENT DOCUMENTS

| | | |
|---|---|---|
| 2,923,844 | 2/1960 | Gundert . |
| 3,035,198 | 5/1962 | Skoyles . |
| 3,430,099 | 2/1969 | Ashley . |
| 3,440,483 | 4/1969 | Kaashoek et al. . |
| 3,553,523 | 1/1971 | Budd . |
| 3,562,683 | 2/1971 | De Santis et al. . |
| 3,793,554 | 5/1974 | Rossaert . |
| 3,851,215 | 11/1974 | Dekeijser et al. . |
| 4,088,930 | 5/1978 | Barten . |
| 4,217,566 | 8/1980 | Hamano et al. . |
| 4,227,122 | 10/1980 | Ikoma et al. . |
| 4,318,032 | 3/1982 | Kurcha . |
| 4,547,707 | 10/1985 | Yabase . |
| 4,556,857 | 12/1985 | Logan . |

(List continued on next page.)

FOREIGN PATENT DOCUMENTS

| | | |
|---|---|---|
| 0315269A1 | 10/1988 | European Pat. Off. . |
| 2-75135 | 3/1990 | Japan . |
| 69-09887 | 12/1970 | Netherlands . |
| 69-10495 | 1/1971 | Netherlands . |
| 8902436 | 10/1989 | Netherlands . |
| 964066 | 7/1964 | United Kingdom . |

OTHER PUBLICATIONS

"An Improved Micro–Spot Cathode–Ray Tube", C. B. Brooks, P. G. Davey and S. S. Willder, pp. 346–350.
"Analysis of Bubble Chamber Data", A. H. Rosenfeld and W. E. Hamphrey, pp. 103–144.
Article entitled "Trends of '88 Color TV Line (V)", publ. in Gijutsu, Japanese publ., dated 1988.
Article entitled "A new Picture Tube System With Homogeneous Spot Performance" in the names of Gerritsen et al., publ. in Japan Display '89, pp. 458–461.
Article entitled "Deflection Yoke For Trinitron 20×20 in. Color CRT" in the names of Murata et al., publ. in SID 89 Digest, pp. 49–52.
A Book entitled "Electron And Ion Optics", publ. 1988, the author being M. Szilagyi, pp. 468–475.
Article entitled "32" High–Brightness Color Display for HDTV", authors being Ohsawa et al., distr. & presented in a SID Symposium Dec. 8, 1989.
U.S. Pat. application Ser. No. 554,503, filed Jul. 19, 1990, entitled "A Deflection Sys. With A Pair of Quadrupole Arrangements", in the names of Johnson & Grote.

*Primary Examiner*—Theodore M. Blum
*Attorney, Agent, or Firm*—Joseph S. Tripoli; Joseph J. Laks; Sammy S. Henig

[57] ABSTRACT

A deflection apparatus produces a field gradient that reduces a tendency of a major axis of a beam spot to become elongated at each corner, at each end of a horizontal axis and at each end of a vertical axis of a display screen relative to the beam spot at the center of the display screen. A beam spot stigmator causes the beam spot to be substantially anastigmatic at each of the corners, the end of the horizontal axis and the end of the vertical axis of the display screen.

10 Claims, 16 Drawing Sheets

U.S. PATENT DOCUMENTS

| | | |
|---|---|---|
| 4,642,527 | 2/1987 | Takahashi et al. . |
| 4,683,405 | 7/1987 | Truskalo et al. . |
| 4,725,763 | 2/1988 | Okuyama et al. . |
| 4,730,216 | 3/1988 | Casey et al. . |
| 4,845,401 | 7/1989 | Shimoma et al. . |
| 4,864,195 | 9/1989 | Masterton .............................. 315/368 |
| 4,866,336 | 9/1989 | Sluyterman . |
| 4,900,979 | 2/1990 | Shimoma et al. . |
| 5,027,042 | 6/1991 | Sluyterman et al. ................... 315/368 |
| 5,028,850 | 7/1991 | Grote et al. ........................... 315/371 |
| 5,086,259 | 2/1992 | Sakurai ............... 315/368.25 |
| 5,327,051 | 7/1994 | Johnson et al. ................... 315/368.28 |

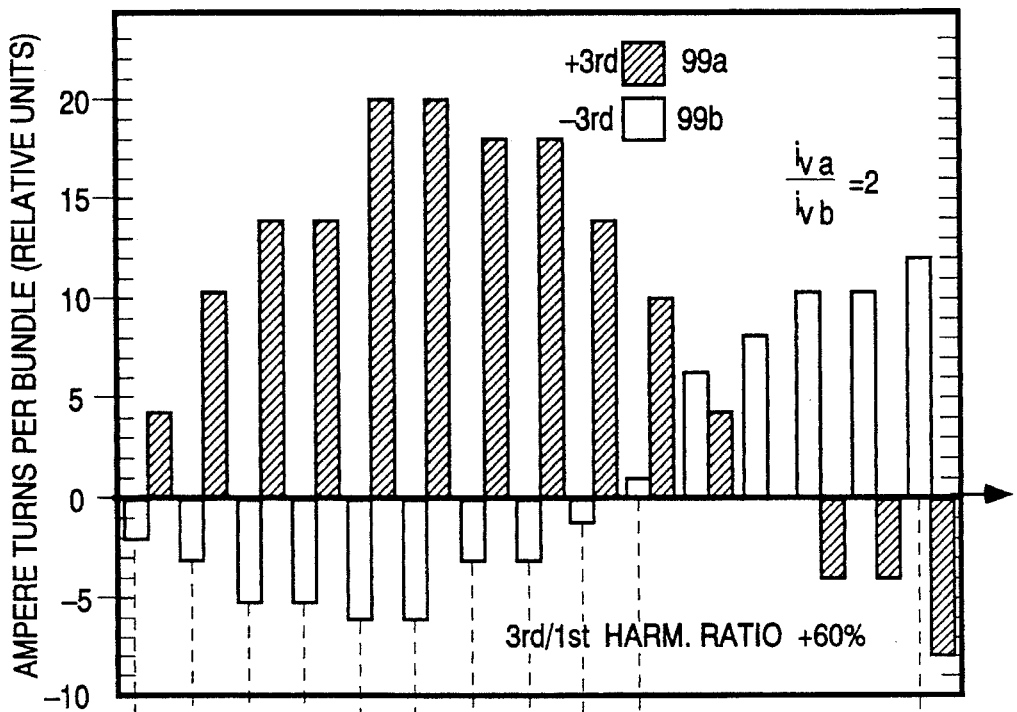
FIG. 12c
FIG. 12d
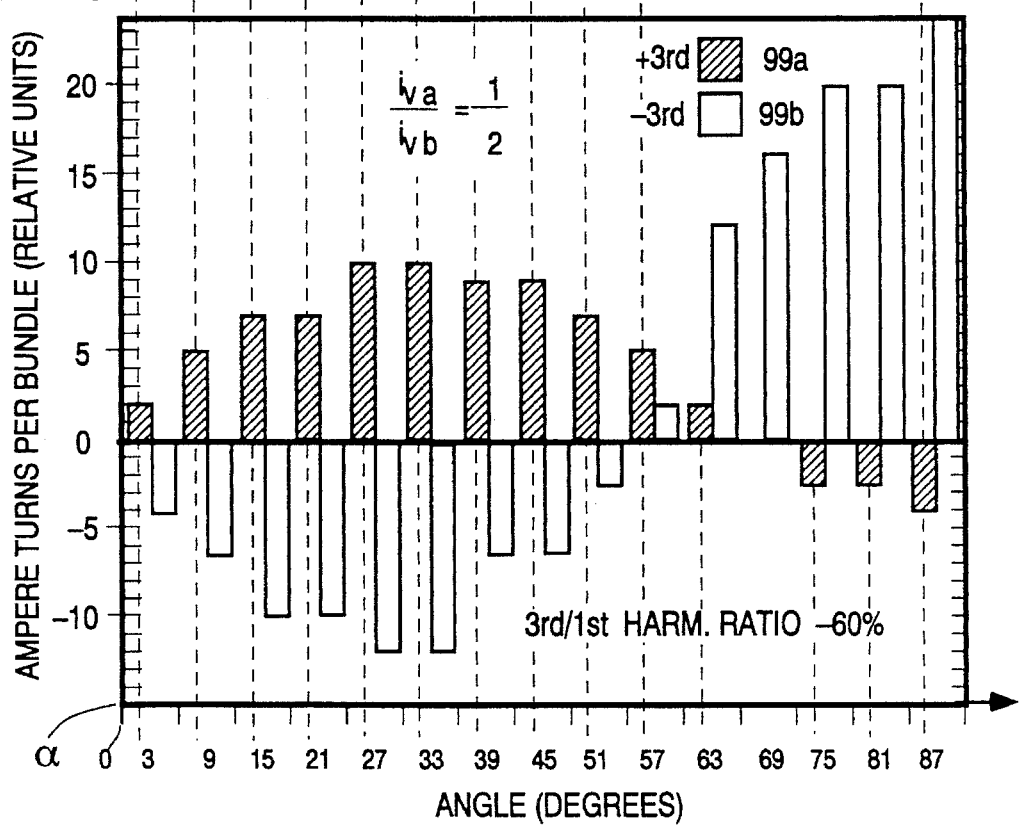

DEFLECTION SYSTEM WITH A CONTROLLED BEAM SPOT

This is a continuation of application Ser. No. 723,289, filed Jun. 28, 1991, now abandoned, which is a continuation of an application Ser. No. 554,644, filed Jul. 19, 1990, now U.S. Pat. No. 5,028,850.

The invention relates to a deflection system in which a field nonuniformity provides an electron beam lensing action to control the shape and size of a spot formed by an electron beam landing on, for example, a display screen of a cathode ray tube (CRT).

Spot enlargement and distortions are due to, for example, the obliquity of the screen and space-charge repulsion. Reducing the enlargement and distortion of the spot as the electron beam is deflected by the deflection yoke may be required in, for example, high definition television (HDTV).

In a deflection system that uses a self-converged yoke, dynamic focus and stigmators have been developed to eliminate overfocusing and "flare" that degrade high-resolution images. Such system, however, produces distorted spots at the extreme side edges of the horizontal axis of the screen. For example, at the 3 o'clock hour point at the end of the horizontal axis of the display screen, the spot is elliptic and elongated in the horizontal direction, about twice the spot width at screen center. Such distortion may be unacceptable for high-resolution displays.

In an anastigmatic deflection yoke, each of a horizontal deflection coil and a vertical deflection coil produces a corresponding so-called uniform-field, namely, without significant flux density gradient. A deflection field that is close to being a uniform-field is produced in a deflection coil in which the winding distribution, or angular density of the winding conductors contains only a fundamental, or first harmonic component, in accordance to the Fourier series expansion.

In the Fourier series expansion, the n-th harmonic may refer to the Fourier component of the n-th order of the winding distribution, or winding-current product distribution. Such winding distribution, or winding-current product distribution is periodic as a function of an angle measured from, for example, the horizontal axis of the yoke. The term winding-current product, typically depicted by the notation, N●I, refers to a value obtained when multiplying the number of winding turns by the current in a given winding turn. Such term is measured by the units ampere-turns. The term winding-current product or winding-current product distribution may be associated with a current component that flows in such winding turns at, for example, the horizontal rate or at the vertical rate.

A variation in the beam landing location that is caused by a corresponding change of the fundamental Fourier component of the winding-current product distribution, alone, tends to produce an elongation in the beam spot. For example, in one prior art deflection system that employs only the uniform deflection field in a main deflection region, a length of a major axis of the spot produced at, for example, the 3 o'clock hour point tends to be elongated in the horizontal direction by approximately 1.5 times the spot major axis at the screen center, as shown in FIG. 1. In this case, the spot also tends to be elongated at various locations on the display screen in the direction of the deflection such that the major axis of the elliptic spot coincides with the direction of the deflection. The direction of the deflection with respect to a given spot is the direction formed between the spot and the center of the display screen. As shown in FIG. 1, the ratio between the length of the major axis of the spot to the length of the minor axis of the spot tends to increase as the beam spot is deflected away from the center toward the edges of the screen. For example, such ratio at the screen center is equal to 1 since the spot is round; whereas, at the 3 o'clock point it is 1.48/0.86 or about 1.7. Such ratio defines the ellipticity of the spot. The larger is the value of such ratio, the greater is the ellipticity of the spot. The difference in such ratios is indicative of the extent of the aforementioned spot shape distortion.

In accordance with an aspect of the invention, a first nonuniform field is produced in a first region of a path of the electron beam. The first nonuniform field forms an electron beam lensing action that tends to converge the beam spot at the display screen in the direction of spot elongation. A second nonuniform field is produced in a second region of the electron beam path that is further away from the display screen than the first region. The second nonuniform field forms an electron beam lensing action that tends to diverge the beam spot in the direction of spot elongation. The nonuniformity of each of the fields causes different portions of a given cross section or profile of such electron beam to be deflected by slightly different amounts in a manner that tends to reduce the aforementioned tendency of the major axis of the spot to become elongated, and of the ellipticity to increase. Therefore, spot shape distortion is reduced.

In carrying out another aspect of the invention, the nonuniformity of the first nonuniform deflection field is produced in a first quadrupole arrangement and the second nonuniform field is produced in a second quadrupole arrangement such that both arrangements operate in a manner analogous to that of a quadrupole doublet.

In carrying out a feature of the invention, the first nonuniform field is established between an exit and an entrance region of a deflection yoke for rendering a beneficial electron beam lensing action that, advantageously, reduces the ellipticity of the spot. The nonuniformity of or flux density gradient of a deflection field that is required to, for example, converge the beam spot, may be different in accordance with the spot position on the screen. For example, at the corners of a display screen with a 4:3 aspect ratio, the type of nonuniform deflection field in the yoke that is required can be formed by a combination of pincushion shaped, horizontal and vertical deflection fields; whereas, when the spot is at each of the vertical and horizontal axes of the screen, barrel shaped, horizontal and vertical deflection fields may be required. The terms barrel and pincushion are used herein primarily to indicate the type or sense of deflection field gradient. For example, a barrel shaped horizontal deflection field refers to a horizontal deflection field formed in and around the beam at a given location in the yoke that decreases along the horizontal axis of the yoke as a function of the distance from the center of the yoke.

FIG. 12a–12d illustrate winding-current product distributions in a given quadrant of corresponding deflection windings of the arrangement of FIG. 9 that provide corresponding harmonic ratios required for reducing beam spot elongation;

Figure 2:
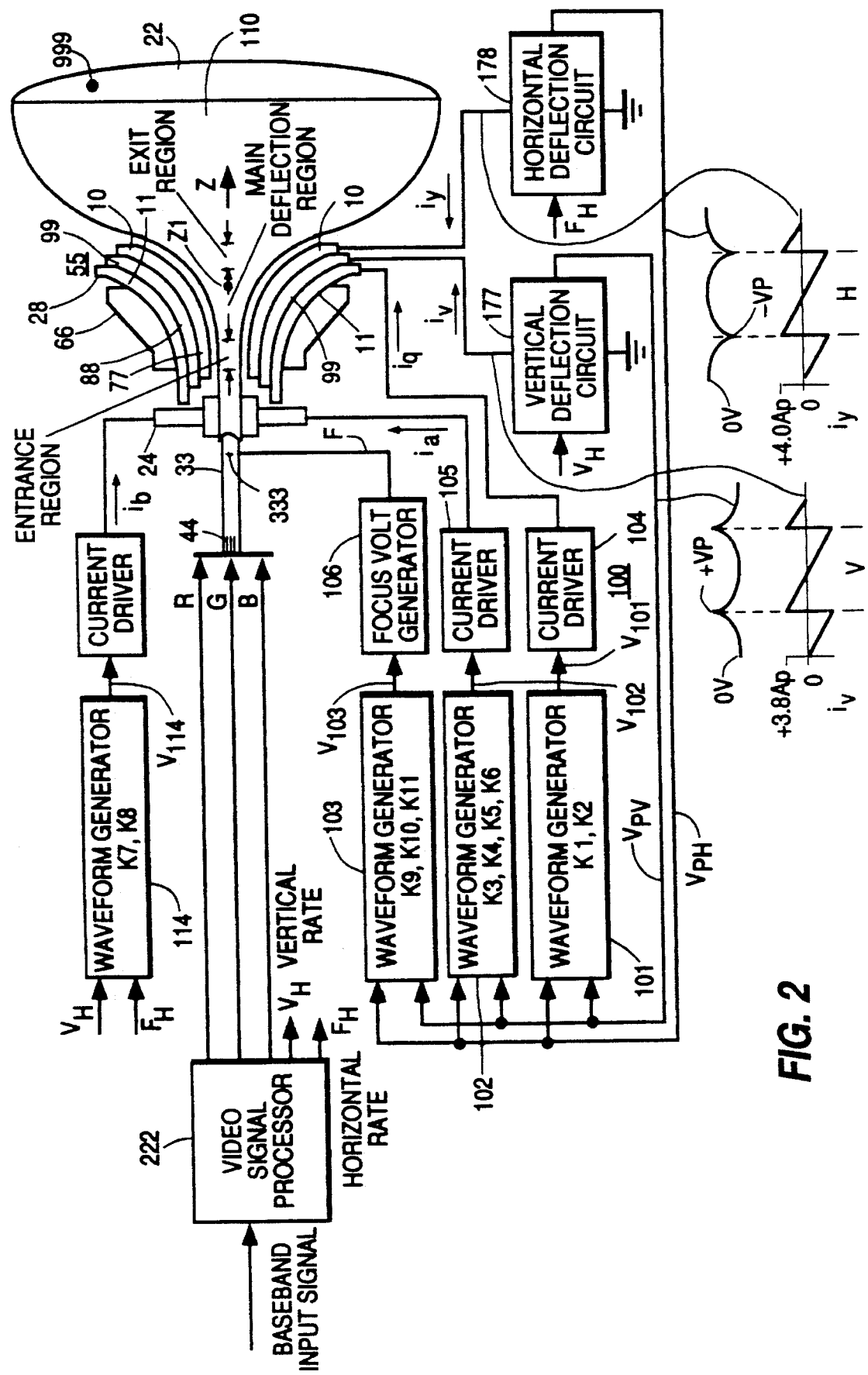
FIG. 2 illustrates a block diagram of a deflection apparatus embodying an aspect of the invention, that includes a quadrupole coil arrangement.

FIG. 2 illustrates a deflection system 100, embodying an aspect of the invention, in which an electron beam lensing action that tends to converge the beam spot in the direction of the deflection is produced in a main deflection region of a yoke 55. Deflection system 100 of FIG. 2 may be used in, for example, a television receiver. Deflection system 100 includes a CRT 110 of the 25V110 type having, for example, 110 degree maximum deflection angle. CRT 110 has a longitudinal axis Z that is perpendicular to a display screen 22. Display screen 22 is of, for example, the 25-inch viewing screen type having, for example, a 4:3 aspect ratio.

A neck end 33 of CRT 110 contains an electron gun 44 that produces three electron beams. The electron beams produced by gun 44 are modulated in accordance with video signals R, B, and G, respectively, for producing an image on display screen 22. A given one of the beams produces a spot 999 that, when scanned, forms a raster on display screen 22 at a corresponding color.

Deflection yoke 55, embodying an aspect of the invention, is, for example, of a saddle-saddle-saddle type and is mounted on CRT 110. Deflection yoke 55, shown in a partial cross sectional view, includes a line or horizontal deflection yoke assembly 77 formed by a pair of saddle coils 10 that surround a portion of neck 33 and a portion of a conical or flared part of CRT 110. Deflection yoke 55 further includes a vertical or field deflection coil assembly 88 formed by a pair of saddle coils 99 that surround coils 10. Deflection yoke 55 further includes a quadrupole coil assembly 28 formed by a pair of saddle coils 11 that surround coils 99. Deflection yoke 55 further includes a core 66 having a conically shaped body that is made of a ferrite magnetic material and that surrounds coils 11. The main deflection region of yoke 55 is formed between a beam entrance end and a beam exit end of core 66. Horizontal axis X and vertical axis Y of screen 22 are such that when coils 99 are not energized, the spot is positioned along axis X and when coils 10 are not energized the spot is positioned along axis Y.

A vertical deflection circuit 177 that may be conventional produces a vertical sawtooth current $i_y$ that is coupled to field deflection coil assembly 88 and also produces a vertical rate parabolic signal $V_{pv}$. Current $i_y$ and signal $V_{pv}$ are synchronized to a vertical synchronization signal $V_H$, produced in a well known manner. A horizontal deflection circuit 178 that may be conventional produces a horizontal sawtooth current $i_y$ that is coupled to line deflection coil assembly 77 and also produces a horizontal rate parabolic signal $V_{ph}$. Current $i_y$ and signal $V_{ph}$ are synchronized to a horizontal synchronization signal $F_H$, produced in a well known manner.

In accordance with a feature of the invention, yoke 55 operates as an electron beam lens, as well as a beam deflector. The electron beam lensing action of yoke 55, that is similar to each of the three beams, is explained herein with respect to only one of the electron beams. The electron beam lensing action reduces spot elongation. The electron beam lensing action is obtained by producing a deflection field having a field nonuniformity. The nonuniformity of the deflection field causes different portions of the beam at a given cross section or profile in the electron beam path in deflection yoke 55 to be deflected by slightly different amounts in a manner that tends to reduce spot elongation and also tends to reduce the tendency of the ellipticity of the spot to increase, thus providing lensing action. A more detailed explanation of how a nonuniformity in the deflection fields reduces the ellipticity in the spot is provided later on.

A stigmator 24, described in more detail later on, is positioned to surround neck 33 behind yoke 55. Stigmator 24 is interposed between gun 44 and yoke 55. Stigmator 24 produces a magnetic field having a field nonuniformity in neck 33 outside yoke 55 for eliminating an astigmatism produced by the lensing action of yoke 55 so as to make spot 999 anastigmatic. Spot 999 is considered anastigmatic if the entire area of the electron beam spot can be focused at a single level of a focus voltage F applied to a focus electrode 333 of CRT 110.

Coils 11 are driven by a current iq that produces a negligible magnetic field when spot 999 is positioned at the corners at, for example, the 2 o'clock hour point and substantially anywhere on the diagonals of display screen 22, as described later on. Therefore, the electron beam lensing action of yoke 55, when spot 999 is at the corners of display screen 22, is substantially unaffected by quadrupole coil assembly 28.

A winding distribution in horizontal deflection coils 10 in a given plane that is perpendicular to axis Z having a coordinate Z=Z1 is representative of the winding distribution in a main deflection region of yoke 55. To obtain the deflection field nonuniformity that produces, for example, a round spot at the corners of display 22, a predetermined winding distribution of each of horizontal deflection coils 10 and vertical coils 99 is established. Winding distribution parameters may be established empirically for obtaining a round spot at each of the corners of display screen 22, such as, for example, at the 2 o'clock hour point. The winding distribution of coils 10 in such plane is selected to obtain a positive, first ratio of about +10% between a positive third harmonic component and a fundamental harmonic component. Such positive first ratio indicates a pincushion shaped horizontal deflection field. By convention, with respect to horizontal coils, a positive sign of the third harmonic indicates a pincushion field and a negative sign indicates a barrel field. Similarly, a winding distribution in vertical deflection coils 99 in plane Z=Z1 is selected to obtain a negative second ratio of about −60% between a magnitude of a negative third harmonic component and that of a fundamental harmonic component, indicating also a pincushion shaped field. By convention with respect to vertical deflection coils, a negative sign indicates a pincushion field and a positive sign indicates a barrel field.

The aforementioned values of the first and second ratios are selected primarily for obtaining spot 999 that is, for example, round. Convergence and geometry errors may be corrected by other arrangements, not in yoke 55, as described later on. The sign of each ratio is selected to obtain the desired type of field nonuniformity, namely pincushion shaped horizontal deflection field and pincushion shaped vertical deflection field at the corner. When focused by the operation of focus electrode voltage F of CRT 110 and made anastigmatic by the operation of stigmator 24, spot 999, at a given corner of screen 22, will obtain a shape with optimal ellipticity. For a typical CRT, optimal ellipticity is obtained when spot 999 has, for example, a round shape. Thus, the first and second ratios establish a desired first electron beam lensing action of yoke 55 for obtaining, for example, a round spot at the corners of display screen 22. Advantageously, yoke 55 significantly reduces a ratio between a length of a major axis of spot 999 at the corner of display screen 22 and a major axis of spot 999 at the center of display screen 999 relative to such ratio of FIG. 1. Gun 44 and stigmator 24 form an additional electron beam lensing action that makes spot 999 anastigmatic.

When the spot is on the horizontal axis X of the screen, a barrel shaped horizontal deflection field, alone, can produce the required field gradient in the beam path for reducing spot elongation, thus establishing the first electron beam lensing action. Similarly, when the spot is along the vertical axis Y, a barrel shaped vertical deflection field, alone, can produce the required field gradient in the beam path for reducing spot elongation.

In a barrel shaped vertical deflection field, the flux density along axis Y generally decreases as the distance from the screen center increases when the spot is located on axis Y; in a pincushion shaped vertical deflection field, the field gradient is generally opposite.

The field or flux density gradient in yoke 55 that is required for reducing spot elongation on axes X and Y is established mainly by quadrupole coil assembly 28 formed by saddle coils 11 having quadrupole symmetry. The quadrupole deflection field component produced by coils 11 corrects the elliptical distortion of the spot when the spot lies on each of axis X or Y of display screen 22 and reduces the elongation of the major axis of spot 999 relative to such length at the center of screen 22. Coils 11 do not significantly affect the nonuniformity of the magnetic fields when spot 999 is at each of the corners, as explained later on.

Figure 3:
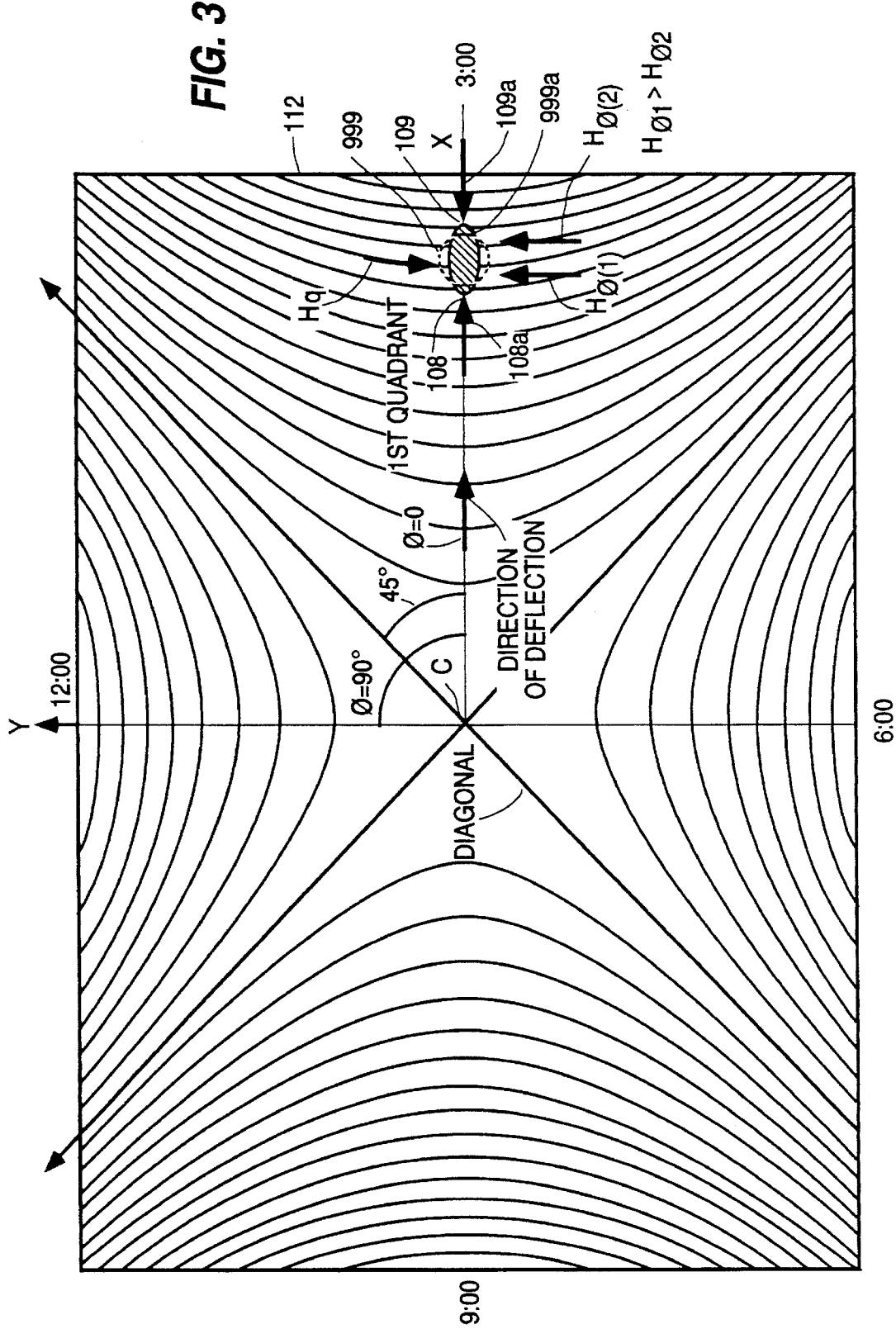
FIG. 3 illustrates a diagram of a quadrupole field that is produced in the arrangement of FIG. 2 and its effect on a cross section of an electron beam.

FIG. 3 illustrates, schematically, the flux or field produced by coils 11 of quadrupole 28 having a winding-current product distribution that contains mainly a second harmonic component. The flux shown is representative of the flux in the plane or beam path region having the coordinate Z=Z1 depicted by a rectangle 112. Similar symbols and numerals in FIGS. 1, 2 and 3 indicate similar items or functions. Arrow $H_q$ in FIG. 3 represents the direction of flux density of the field or flux component produced only by coils 11 in yoke 55 when spot 999 is at the 3 o'clock hour point at the end of axis.

When spot 999 of FIG. 2 is at the 3 o'clock hour point of screen 22 of FIG. 2, the field represented by arrow $H_q$ of FIG. 3, produced by coils 11 of FIG. 2, has a direction that is generally opposite to the direction of the pincushion shaped horizontal deflection field component, not shown, produced by horizontal deflection coils 10. The strength of the field produced by coils 11 increases in the direction of the deflection. The combined effect of the two fields produces a net or total deflection field that is obtained by a vectorial summation of the field components.

The magnitude of current iq of FIG. 2 that energizes coils 11 is made sufficiently large to change the deflection field nonuniformity in the beam path at each end of the horizontal axis X of rectangle 112 of FIG. 3, when spot 999 is at the corresponding 3 and 9 o'clock hour points. The deflection field nonuniformity is changed by current iq from being pincushion shaped to a deflection field that can be produced in the beam path by a barrel shaped horizontal deflection field, alone. Thus, a net deflection field $H_{\phi(1)}$, closer to a center point C of rectangle 112, is stronger than a net deflection field $H_{\phi(2)}$, that is further from the center C. Similarly, coils 11 of FIG. 2 produce a net field in the beam path at each end of the vertical axis Y of rectangle 112 when spot 999 is at the 6 and 12 o'clock hour points, respectively, of FIG. 3 having a deflection field nonuniformity that can be produced in the beam path by a barrel shaped vertical deflection field, alone.

For explanation purpose, a highly elliptic beam profile or cross section 999a of FIG. 3 shows how the cross section of the beam, in rectangle 112 of yoke 55 of FIG. 3, might have looked like when spot 999 of FIG. 2 is at the 3 o'clock hour point of screen 22 of FIG. 2 had the horizontal deflection field been entirely a uniform field. The particular ellipticity of cross section 999a has been selected for explanation purposes, only. Also, for explanation purposes, the field nonuniformity caused by coils 10 and 99 has been neglected since the field nonuniformity produced there by coils 11 dominates.

The field nonuniformity or flux density gradient produced by coils 11 together with the field nonuniformity produced by stigmator 24 tends to make spot 999 of FIG. 2 anastigmatic and close to being round such that the ratio between the major axis of spot 999 at the end of the horizontal axis and that at the center of screen 22 is substantially smaller than if the electron beam were to travel entirely in a uniform horizontal deflection field. Consequently, the aforementioned tendency of the shape of the spot to become distorted or elliptic relative to its round shape at the screen center is, advantageously, reduced. The nonuniformity in the flux density, or flux density gradient produced by, for example, the resulting barrel shaped horizontal deflection field causes, for example, an end portion 108 of cross section 999a of the electron beam of FIG. 3 that is closer to center point C of rectangle 112 to be deflected away from center point C in the direction of the deflection X a longer distance, or more strongly than a second end portion 109 that is further away from center point C. This situation that is depicted schematically by straight arrows 108a and 109a is equivalent to having magnetic forces applied at opposite directions to end portions 108 and 109, respectively, as a result of the field nonuniformity or flux density gradient. The result is that yoke 55 of FIG. 2, in addition to performing scanning or deflection action, operates as an electron beam lens that converges spot 999 in the direction of its elongation. In the case of FIG. 3, the direction of elongation is also the direction of the deflection, X.

Assume that spot 999 is already focused in the absence of the magnetic forces represented by arrows 108a and 109a. The result of the beam converging magnetic forces represented by arrows 108a and 109a is that extreme left and right end portions of spot 999 along its major axis in the direction of horizontal axis X become overconverged. Thus, the left and right end portions tend to converge at a plane that is located between display screen 22 of FIG. 2 and yoke 55, instead of on screen 22. The result is that a flare portion, not shown, is produced in the vicinity of the left end portion of spot 999 of FIG. 2 and a flare portion, not shown, is produced in the vicinity of the right end portion of spot 999, along axis X. Such pair of flare portions make spot 999 astigmatic. The flares in spot 999 produced by the deflection field in yoke 55 can be eliminated such that spot 999 becomes again anastigmatic by the use of stigmator 24 of FIG. 2 and/or gun 44.

Stigmator 24 that is located further from screen 22 than yoke 55, produces a field nonuniformity that tends to diverge cross section 999a of FIG. 3 in the direction of axis X. This is in contrast with the beam converging operation of yoke 55 in the direction of axis X. The result is that spot 999 is maintained anastigmatic. By performing the beam converging operation closer to screen 22 and the beam diverging operation further from screen 22, the length of the major axis of spot 999 is reduced, as shown by the circle in broken lines of FIG. 3. Similar electron beam lensing action that converges spot 999 in the direction of the deflection or elongation occurs, by the operation of coils 11, when spot 999 is at each of the 12, 9 and 6 o'clock hour points.

For a given direction of the deflection, φ, the net deflection field in the electron beam path has an azimuthal field component $H_\phi$ such as shown in FIG. 3 in a direction that is generally perpendicular to the direction of the deflection. To reduce elongation of the major axis of spot 999, the component $H_\phi$ in yoke 55 in the vicinity of the electron beam decreases as the distance from the center point C in the direction of the deflection increases. Thus, to obtain such field gradient of field component $H_\phi$ when spot 999 is located at any of axes X and Y of screen 22, such field gradient requires a field nonuniformity that can be formed by a horizontal or a vertical, respectively, barrel-shaped deflection field producing positive isotropic astigmatism. For example, field component $H_\phi$ of FIG. 3 decreases as the distance from the center point C increases in the direction of the deflection along axis X. On the other hand, to obtain such field gradient when spot 999 is located at the corner of a display screen, having a 4:3 aspect ratio, such field nonuniformity is formed by a combination of the pincushion-shaped horizontal deflection field and the pincushion-shaped vertical deflection field. It should be understood that an aspect ratio different from 4:3 may require a different type of field shape to achieve such field nonuniformity at the corners.

Figure 4:
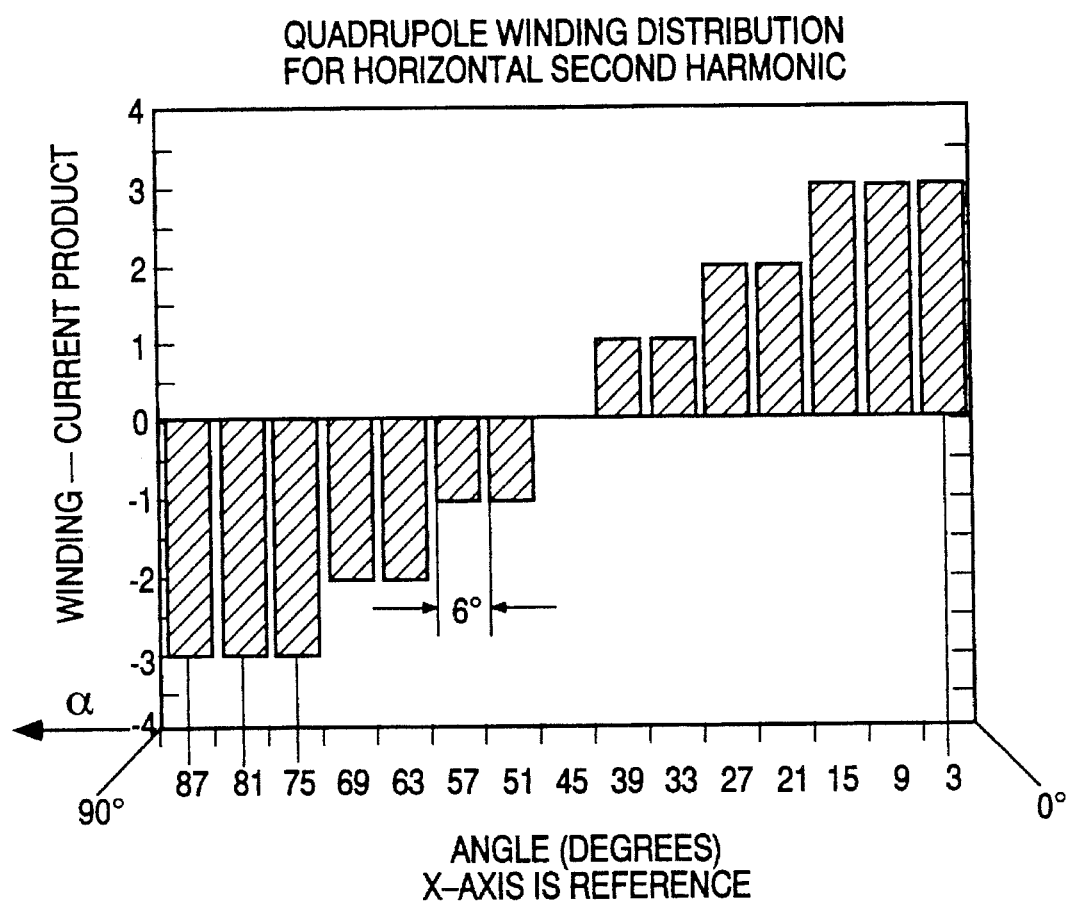
FIG. 4 is a diagram showing a winding-current product distribution in one quadrant of a quadrupole coil of FIG. 2.

The required winding-current product distribution in the first quadrant of coils 11 of FIG. 2 is shown in FIG. 4 as a function of an angle α. Angle α is measured from axis X. Similar symbols and numerals in FIGS. 1, 2, 3 and 4 indicate similar items or functions. Each vertical bar in FIG. 4 represents a winding slot of the first quadrant of coils 11 having a gross angular width of 6 degrees. In each slot, a bundle of conductor windings of the respective coil portion are placed. Thus, fifteen slots span a total of 90 degrees of the first quadrant. The bar height and position relative to the axis represents the magnitude and sign of the winding-current product, N●I, that is produced by the respective bundle in the slot. The winding-current product distribution of coils 11 of FIG. 2 contains substantially only a second harmonic component, defined by the Fourier series expansion.

To obtain one of the polarities of the harmonic component at the second harmonic of the winding-current product, current iq of FIG. 2 that energizes coils 11 is arranged to flow in a predetermined direction in a corresponding bundle of conductor windings of coils 11 between the entrance region and the exit region of the yoke. On the other hand, to obtain, simultaneously, the other one of the polarities of such harmonic component, current iq is arranged to flow simultaneously in the opposite direction, in a second bundle of conductor windings of coils 11.

It may be desirable to vary the strength and provide the proper flux direction of the quadrupole magnetic field produced by coils 11, dynamically, as a function of the position of spot 999 on screen 22 such that the magnetic field in yoke 55 at the corners of display 22 remains substantially unaffected by quadrupole assembly 28. In this way, advantageously, controlling the spot size at the corners is obtained by the winding distribution selected for coils 10 and for coils 99 and not by the winding distribution selected for coils 11; whereas, the spot size is controlled when the spot is at axis X or Y by the selected winding distribution of coils 11 and not of coils 10 and 99. The dynamic variation is used for obtaining the required magnetic field nonuniformity as a function of the beam landings of spot 999 location on screen 22.

To produce current iq that dynamically varies the quadrupole magnetic field produced by coils 11, a waveform generator 101 produces a signal v101. Signal v101 is coupled to current driver 104 that may operate as a linear amplifier for producing current iq that may be linearly proportional to signal 101. Signal v101 is represented by the sum of product terms stated in an equation form, (k1●vpv)+(k2●vph). The terms vpv and vph represent the instantaneous values of signals $V_{pv}$ and $V_{ph}$, respectively, and k1 and k2 are predetermined constants selected for obtaining the desired waveform, as explained later on.

Signal $V_{pv}$ that is produced in deflection circuit 177 is zero when spot 999 is positioned at the center of vertical trace and has a positive peak when spot 999 is positioned at the top or bottom. Signal $V_{ph}$ that is produced in deflection circuit 178 is zero when spot 999 is positioned at the center of horizontal trace and has a negative peak when spot 999 is positioned at the left or right side of screen 22, as shown by the waveforms in FIG. 2. Thus, current iq contains the sum of a parabola-shaped current component in accordance with signal $V_{ph}$ and a parabola-shaped current component in accordance with signal $V_{pv}$. A waveform generator that is capable of producing such waveform is described in detail in U.S. Pat. No. 4,683,405, entitled PARABOLIC VOLTAGE GENERATING APPARATUS FOR TELEVISION, in the names of Truskalo et al., (the Truskalo patent) that is incorporated by reference herein.

FIGS. 5a–5d illustrate waveforms useful for explaining the operation of the arrangement of FIG. 2. Similar symbols and numerals in FIGS. 1, 2, 3, 4 and 5a–5d indicate similar items or functions.

Figure 5:
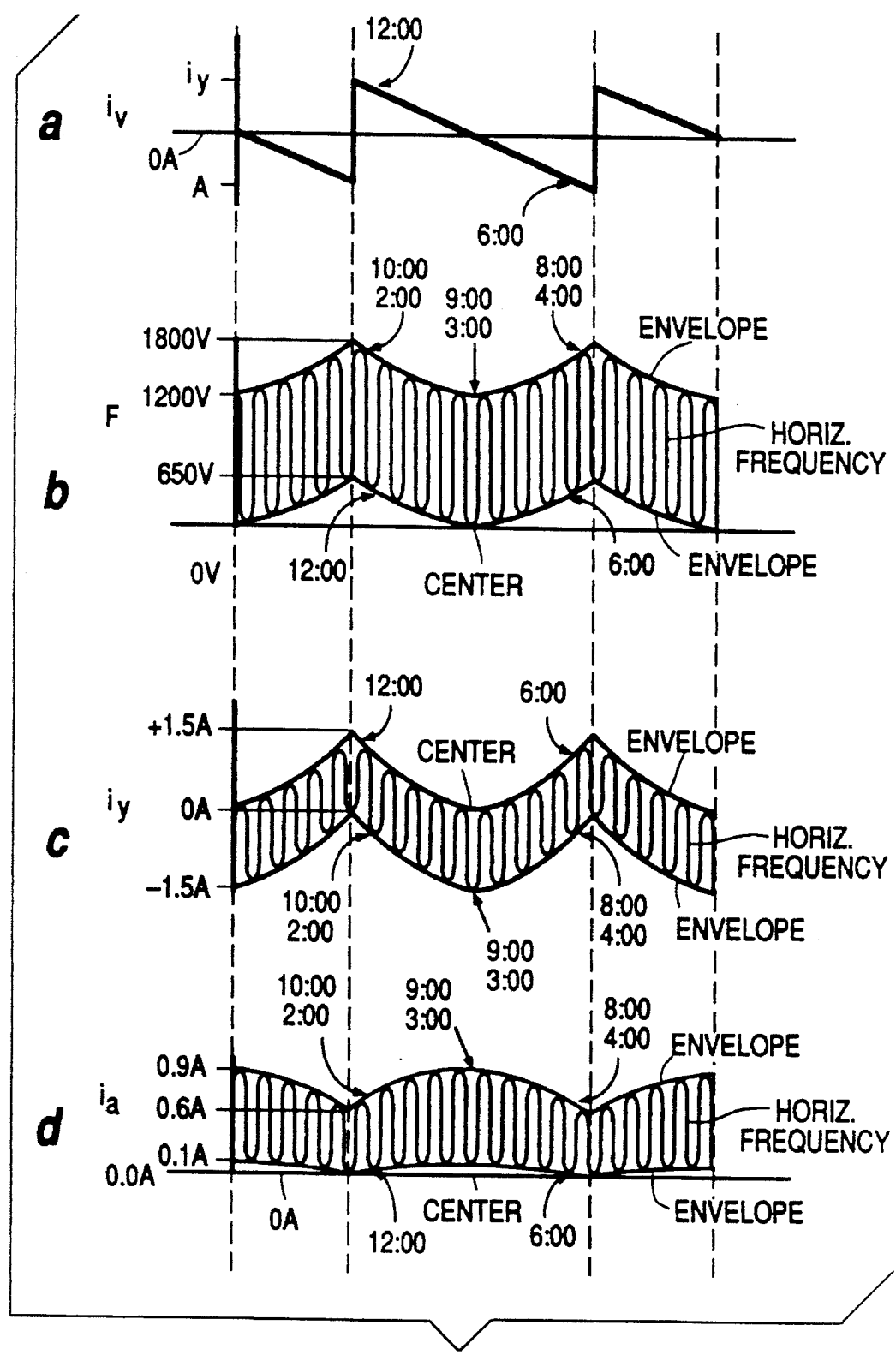
FIGS. 5a–5d illustrate waveforms useful for explaining the operation of the arrangement of FIG. 2.

Constants k1 and k2 of generator 101 of FIG. 2 are selected at values that, for example, are substantially equal, such that the sum of the parabola shaped current components produces a magnitude of current iq that is small or substantially zero, as shown in FIG. 5c, when spot 999 is positioned in the vicinity of the corners of screen 22 of FIG. 2. Therefore, the quadrupole field produced by coils 11 will be, for example, negligible so as not to affect the shape of spot 999 when spot 999 is in the vicinity of the corners or of the diagonals of screen 22, as indicated before. Thus, the shape of spot 999 at the corners of screen 22 is mainly determined by the harmonic components at the negative third harmonic produced by the vertical deflection coils and by the positive third harmonic produced by the horizontal deflection coils. The values of constants k1 and k2 of generator 101 that determine the peak magnitude of current iq of FIG. 5c are selected to produce the required magnitude and polarity of the quadrupole field of coils 11 when spot 999 is located at the 3 and 9 o'clock hour points.

In the arrangement of FIG. 2, for a given value of constants k1 and k2, the magnitude of the quadrupole field when spot 999 is at the 6 or 12 o'clock hour point is also fixed. If desired, a different waveform generator may be used, instead of generator 101, for varying the nonuniformity of the field produced by quadrupole coils 11, in a manner not shown in the figures, such that the strength of the field produced by coils 11 at, for example, the 12 o'clock hour point may be established independently of the strength of the field at the 3 o'clock hour point.

In a self-converged yoke, a spot on axis Y at a given distance from the screen center is less elliptic or more round than a spot produced at the same distance on axis X. This is so because, in the self-converged yoke, the field nonuniformity of the vertical deflection field is already barrel shaped for obtaining convergence. However, in the self-converged yoke, the degree of field nonuniformity, unlike in the arrangement of FIG. 2, is, disadvantageously, not optimized for obtaining round spot.

In the arrangement of FIG. 2, a corresponding winding-current product distribution at a given beam landing location can be selected with respect to each one of the three coils, 10, 99 and 11. The ability to select it with respect to each of the three deflection coils provides a high degree of freedom for establishing the required field nonuniformity. The high degree of freedom enables an overall improvement in reducing spot elongation than, for example, if the winding-current product distribution could be selected with respect to only one of the coils.

When, for example, spot 999 lies on axis X, the net effect of the magnetic field in the beam path in yoke 55 that is determined mainly by coils 11 is similar to that produced by a barrel shaped horizontal deflection field, alone. In contrast, the horizontal deflection coils of a self-converged yoke produce field nonuniformity that results in an undesirable electron beam lensing action. This is so because, in the self-converged yoke, such field nonuniformity, unlike that of the arrangement of FIG. 2, is pincushion shaped. The pincushion shape vertical deflection field tends to produce a significant positive trap convergence and positive anisotropic astigmatism error that may be corrected by another arrangement and not in yoke 55, as explained later on. In comparison, in a self-converged yoke in which the vertical deflection field required for convergence purposes is barrel-shaped, the trap error is minimized in the yoke. When spot 999 lies on axis Y, the net effect of the magnetic field in the beam path that is determined mainly by coils 11 is similar to that produced by a barrel shaped vertical deflection field.

The winding distribution in each of coils 10 and 99 at an electron beam entrance region of yoke 55 is selected to eliminate a distortion in the spot that may be referred to as "spot coma". Spot coma is the difference in distance, as the beam is deflected, between a center portion of the beam and a point located at a point midway between two extreme end portions of the beam. Spot coma occurs because of factors analogous to those responsible for convergence coma of three beams. For example, spot coma may occur due to the nonuniformity of the magnetic field at, for example, the intermediate region. The entrance region has the greatest effect on spot coma. To eliminate spot coma, the winding distribution is made in such a way that the resulting sign of the third harmonic component of the winding distribution at the entrance region of each of coils 10 and 99 of yoke 55 is opposite to the sign of the third harmonic component of the winding distribution associated with the intermediate deflection region of yoke 55.

As explained before, in the intermediate or main deflection region of yoke 55, each of the fields produced by coils 10 and 99 is generally pincushion shaped for producing round corner spots. On the other hand, when the spot lies on the horizontal or vertical screen axis, X or Y, a pincushion shaped deflection field may be undesirable because it causes the spot to be elongated in the direction of the deflection to an unacceptable degree.

In accordance with another aspect of the invention, stigmator 24 of FIG. 2, in cooperation with yoke 55, produces an anastigmatic spot. Stigmator 24 includes a double-quadrupole coil arrangement forming an electromagnet having eight poles. The double-quadrupole coil arrangement of stigmator 24 of FIG. 2 is shown schematically in each of FIGS. 6a and 6b. Similar symbols and numerals in FIGS. 1, 2, 3, 4, 5a–5d and 6a–6b indicate similar items or functions. A quadrupole coil 24a of FIG. 6b that forms four magnetic poles 224 is energized by a current ia. A quadrupole coil 24b of FIG. 6a that forms the alternate magnetic poles 124 is energized by a current ib. Quadrupole coil 24a of FIG. 6b corrects astigmatism generally in the direction of axes X and Y. Quadrupole coil 24b is rotated by 45 degrees relative to quadrupole coil 24a. Coil 24b corrects astigmatism generally in a direction that forms, for example, an angle of +45 degrees with axis X by applying a magnetic force generally in a direction that forms an angle, in such example, of +45 degrees with axis X or Y. The magnitudes and waveforms of currents ia and ib in stigmator 24 and of current iq in coils 11 of yoke 55 are selected for obtaining a beam spot that is anastigmatic when located at the corners and along the axes of screen 22. The use of the double quadrupole coil arrangement of stigmator 24 provides a way to electrically rotate a total quadrupole field produced by stigmator 24 by a predetermined angle relative to axis X in a dynamic manner as a function of the spot landing location.

To produce current ia that is required for correcting the astigmatism of spot 999 in the direction of axis X and Y, a waveform generator 102 that may be similar to that shown in the Truskalo patent produces a signal v102 that is coupled to a current driver 105. Current driver 105 may operate as a linear amplifier. Signal v102 may be represented, for example, by the equation, $$(k3 \bullet vpv) + (k4 \bullet vph) + (k5 \bullet vpv \bullet vph) + k6.$$

The terms k3, k4, k5 and k6 are predetermined constants selected for obtaining the desired waveform. Constant k3 is selected for producing current ia at a level shown in FIG. 5d for reducing the astigmatism in the spot when the spot is positioned at the 12 o'clock hour point of display screen 22 of FIG. 2. Constant k4 is selected for producing current ia of FIG. 5d at a level that reduces the astigmatism in the spot at the 3 o'clock hour point. Constant k5 is selected for producing current ia at a level that reduces the astigmatism in the spot at the 2 o'clock hour point. Constant k6, indicating a DC current, is selected for producing current ia at a level that reduces the astigmatism in the spot at the center of display screen 22.

Current ib is applied to quadrupole 24b, for correcting the astigmatism of spot 999 in the direction that forms an angle of 45 degrees with axis X or Y. To produce current ib, a waveform generator 114 produces a signal V 114. Signal V 114 is represented by the equation, $(k7 \bullet vpv \bullet vph) + k8$. The terms k7 and k8 are predetermined constants selected for obtaining the desired waveform for correcting the astigmatism of spot 999 at the corners of display screen 22. Generator 114 may be similar to that described in U.S. Pat. No. 4,318,032 in the name of Kureha, entitled, CONVER-

GENCE CIRCUIT INCLUDING A QUADRANT SEPARATOR.

Figure 6A:
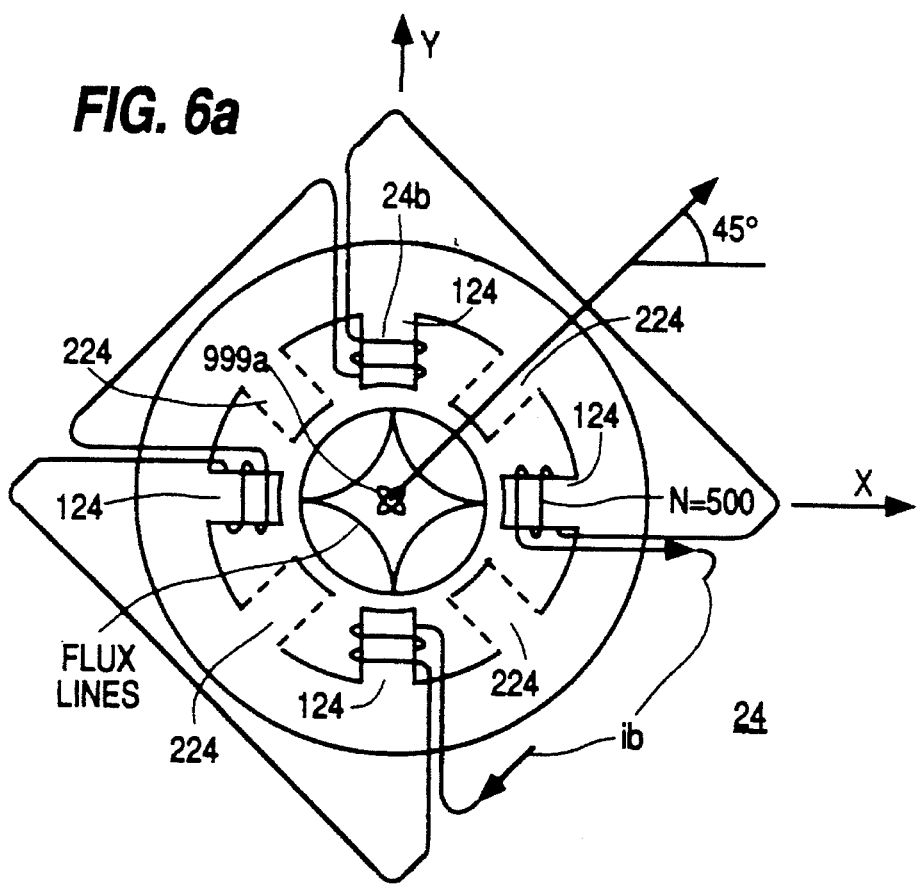
FIGS. 6a and 6b illustrate a double quadrupole arrangement having eight magnetic poles that is included in the arrangement of FIG. 2.
Figure 6B:
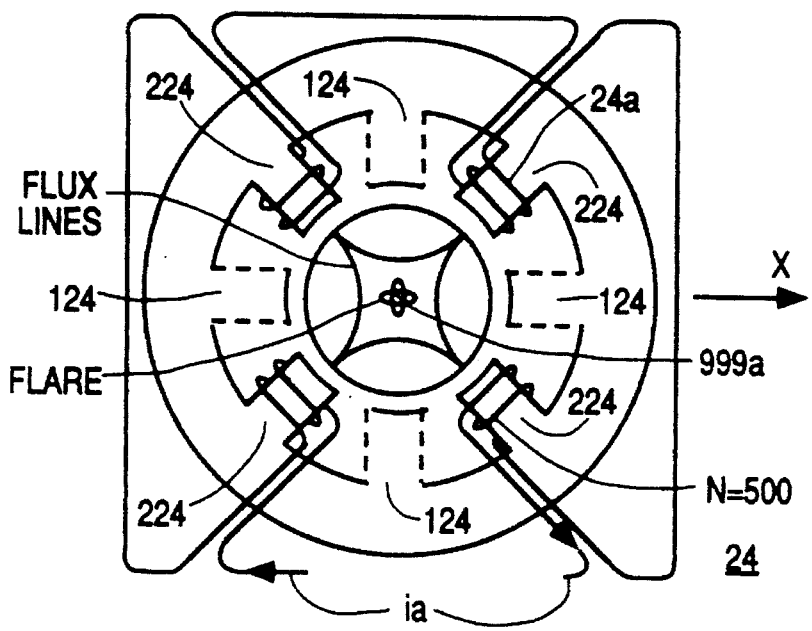
Figure 7A:
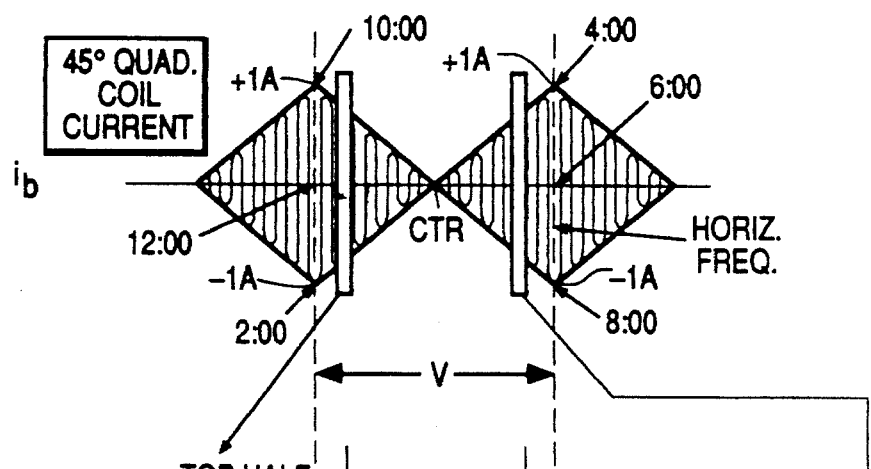
FIGS. 7a–7e illustrate additional waveforms useful for explaining the operation of the arrangement of FIG. 2.
Figure 7B:
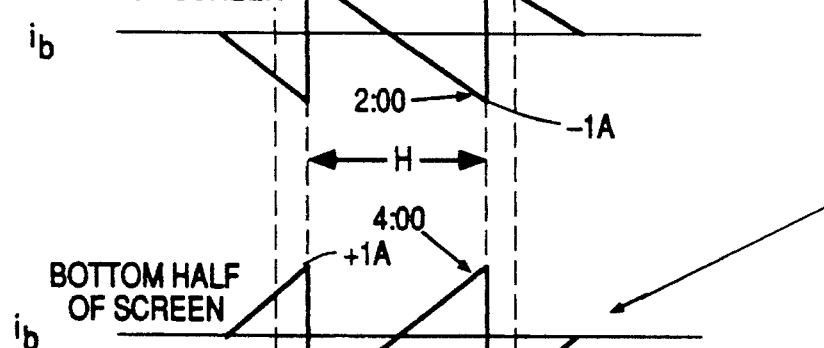
Figure 7C:
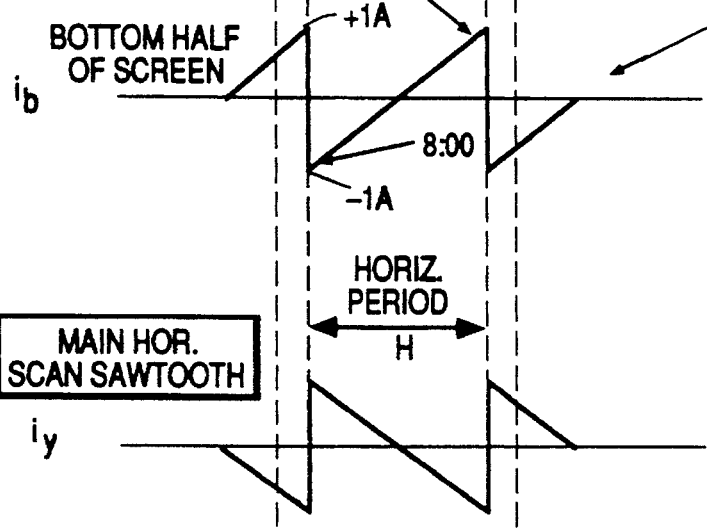
Figure 7D:
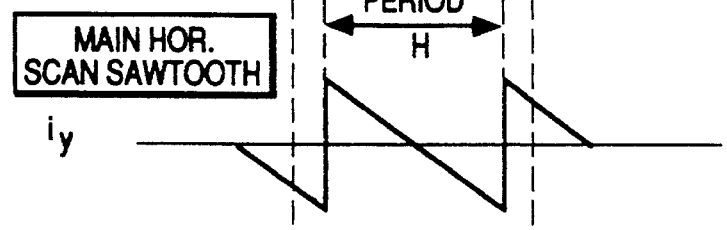
Figure 7E:
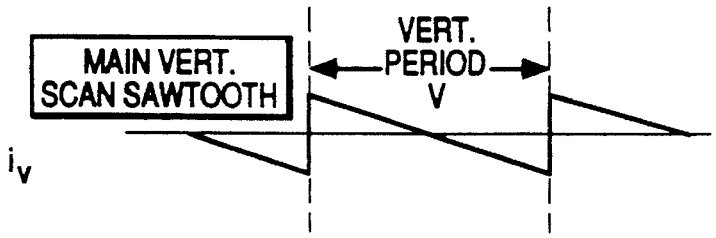

FIGS. 7a–7e illustrate waveforms useful for explaining the operation of the generator 114 of FIG. 2. Similar symbols and numerals in FIGS. 1, 2, 3, 4, 5a–5d, 6a–6b and 7a–7e indicate similar items or functions. Current ib of FIG. 7a has a peak value each time spot 999 of FIG. 2 is in the vicinity of the corners of display screen 22. Current ib of FIG. 7a is zero when spot 999 is at the center of display screen 22, as shown in FIGS. 7a, 7b and 7c, and is also zero at the vicinity of axes X and Y of display screen 22, as shown in FIG. 7a. The phase of current ib changes polarity each time spot 999 of FIG. 2 crosses horizontal axis X at the vertical center of screen 22.

To focus the anastigmatic spot that is produced by yoke 55 and stigmator 24, dynamic focus voltage F is applied to focus electrode 333 of CRT 110. A waveform generator 103 that may be similar to that described in the Truskalo patent produces a signal v103 that is equal to (k9●vpv)+(k10●vph)+(k11●vpv●vph). Constants k9, k10 and k11 are selected for obtaining the required focusing action. Signal v103 is coupled to a focus voltage generator and modulator circuit 106 for producing focus voltage F. Voltage F is dynamically modulated in proportion to signal v103.

Figure 8:
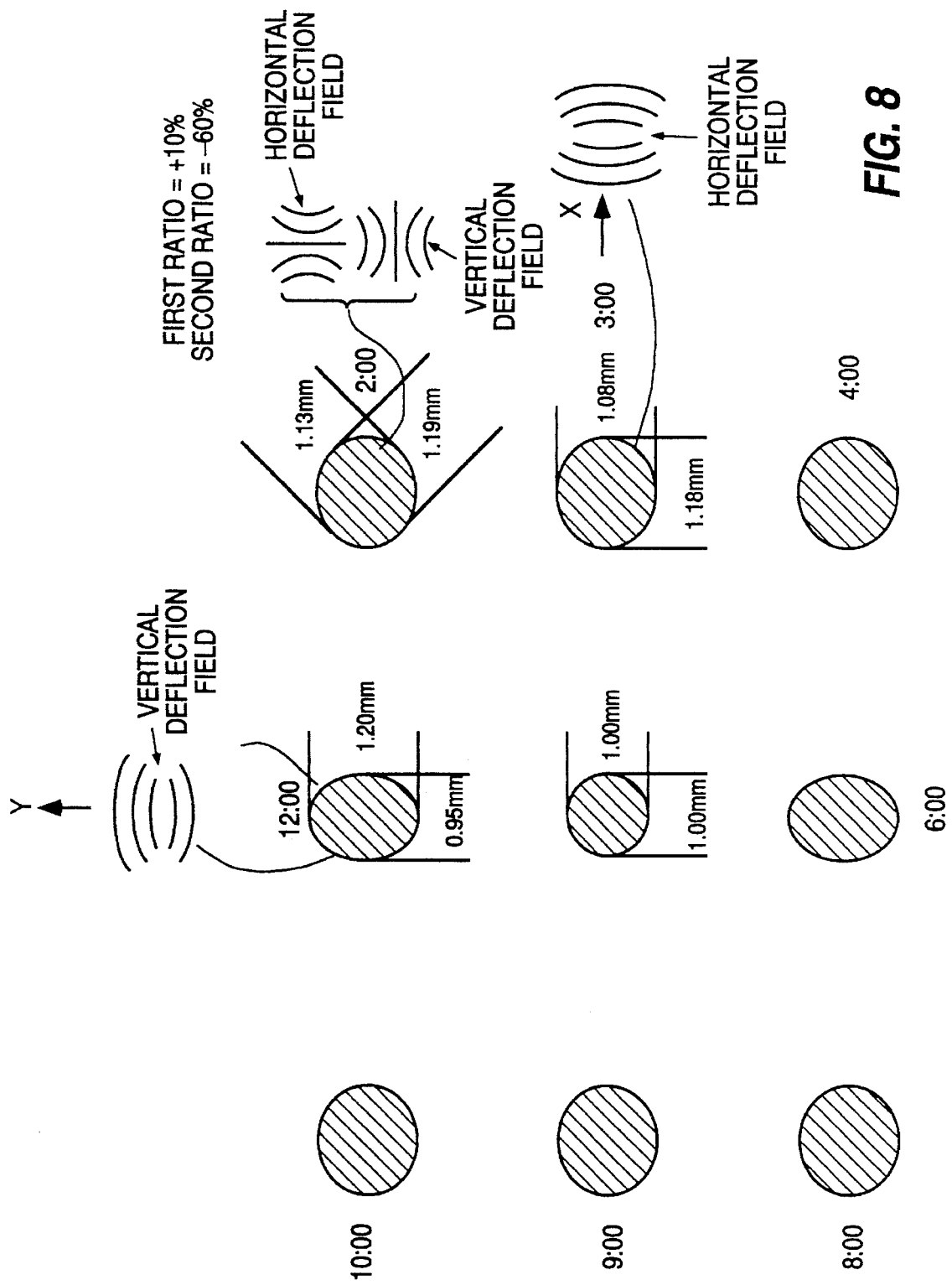
FIG. 8 illustrates the shape of a beam spot at corresponding beam landing locations when a main deflection field is of the type produced in the arrangement of FIG. 2.

Advantageously, the round spot associated with the given electron beam can be produced in CRT 110 of FIG. 2 with a very large beam current of, for example, 3 milliamperes. Also, advantageously, by dynamically varying the nonuniformity or astigmatism of each of the deflection fields in yoke 55, the beam spot becomes focused, anastigmatic, and close to being round, as shown in FIG. 8. Such beneficial electron beam lensing action may be utilized also in conjunction with a monochrome CRT. The type of field nonuniformity of the horizontal or vertical deflection field that can make a round spot at each corresponding hour point is also shown there. Similar symbols and numerals in FIGS. 1, 2, 3, 4, 5a–5d, 6a–6b and 7a–7e and 8 indicate similar items or functions. Advantageously, variations in the size of the spot produced by the arrangement of FIG. 2, as a function of the spot position, as shown in FIG. 8, are substantially smaller from those shown in FIG. 1. As explained before, the spots shown in FIG. 1 are produced by a yoke that produces uniform fields. Thus, in FIG. 1, when the spot is at the end of the horizontal axis, the length of the major axis of the elliptical spot is 1.48 times the diameter of the spot at the center of the display screen that is approximately round at the center. Whereas, in FIG. 8, the maximum increase is only 1.18 times. Advantageously, variations in the ellipticity of the spot produced by the arrangement in FIG. 2, as a function of the spot position, as shown in FIG. 8, are substantially smaller from those shown in FIG. 1.

Figure 9:
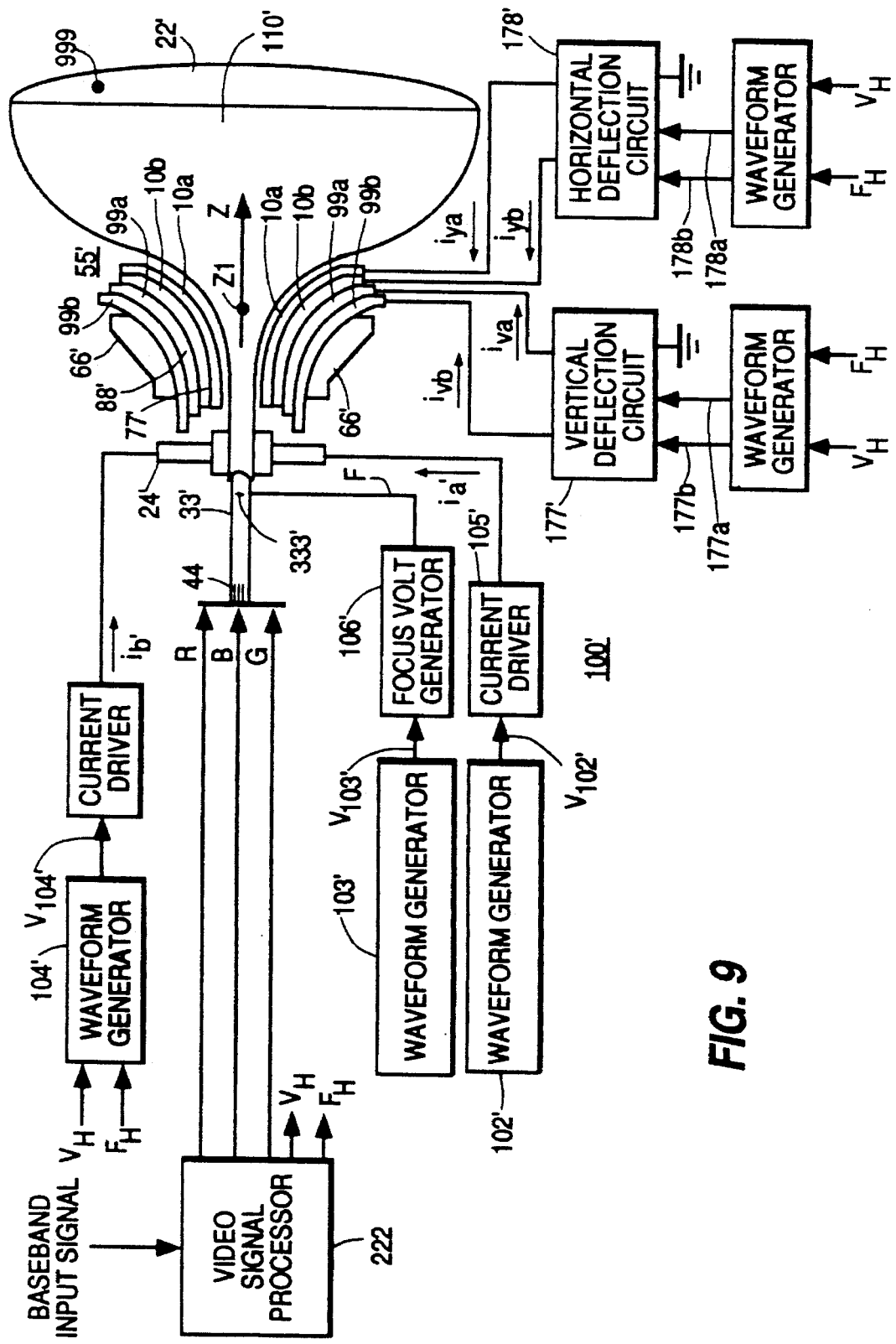
FIG. 9 illustrates a block diagram of a deflection system embodying another aspect of the invention.

FIG. 9 illustrates a deflection system 100', embodying a further aspect of the invention, in which an electron beam lensing action is produced in a yoke 55'. Similar symbols and numerals in FIGS. 1, 2, 3, 4, 5a–5d, 6a–6b and 7a–7e, 8 and 9 indicate similar items or functions. Deflection system 100' includes a CRT 110' that may be similar to CRT 110 of FIG. 2. Deflection yoke 55', embodying an inventive feature, is mounted on CRT 110'. Deflection yoke 55', shown in a partial cross sectional view, includes a line deflection yoke assembly 77' formed by a pair of saddle coils 10a that surround a portion of a neck 33' of CRT 110' and a pair of saddle coils 10b that surround saddle coils 10a. Deflection yoke 55' also includes a field deflection coil assembly 88' formed by a pair of saddle coils 99a that surrounds coils 10b and a pair of saddle coils 99b that surround coils 99a.

The winding distribution in each of coils 10a, 10b 99a and 99b at an electron beam entrance region of yoke 55' is selected to eliminate the distortion in the spot that was referred to before as spot coma. A core 66' forming a portion of a conical shaped body and made of a ferrite magnetic material surrounds coils 99b. A stigmator 24' that may be similar to that of FIG. 2 performs the analogous function.

In the intermediate and exit regions of yoke 55' of FIG. 9, the winding-current product distribution or angular density of the windings that form coils 10a is made to vary in accordance with a sum of a fundamental harmonic component and of a harmonic component at the positive third harmonic, as defined by the Fourier series expansion. The ratio between a magnitude of the harmonic component at the third harmonic and that of the fundamental harmonic component of the winding-current product distribution of coils 10a is established to be about +90%.

On the other hand, the winding distribution or angular density of the windings that form coils 10b is made to vary in accordance with a sum of a fundamental harmonic component and of a harmonic component at a negative third harmonic, as defined by the Fourier series expansion. The ratio between a magnitude of the harmonic component at the third harmonic and that of the fundamental harmonic component of the winding-current product distribution of coils 10b is established at about −110%.

A horizontal deflection circuit 178' produces a horizontal deflection current iya in coils 10a and a horizontal current iyb flows in coils 10b. Current iya causes the winding-current product distribution of coils 10a to contain a harmonic component at the third harmonic at a predetermined polarity and also a harmonic fundamental component. Similarly, current iyb causes a harmonic content produced by coils 10b to contain a harmonic component at the third harmonic at the opposite polarity and also a fundamental harmonic component.

A ratio between the magnitudes of currents iya and iyb is controlled and varies as a function of the position of the spot on screen 22. Variation of such ratio varies the flux density gradient or nonuniformity of the horizontal deflection field produced by the combined arrangement of coils 10a and 10b as a function of the position of the spot. The particular ratio selected between the magnitudes of currents iya and iyb determines whether the combined arrangement of coils 10a and 10b produces a total pincushion or a total barrel shaped horizontal deflection field. Such current ratio determines the magnitude and sign of a first sum that is the sum of the third harmonic components of the combined arrangement of coils 10a and 10b.

The ratio between the magnitudes of currents iya and iyb also determines a second sum that is the sum of the fundamental harmonic components of the combined arrangement of coils 10a and 10b. A third ratio is defined as the ratio between the first and second sums. Thus, the third ratio is defined between the sum total of the harmonic components at the third harmonic and the sum total of the harmonic fundamental component of the horizontal rate deflection field. The third ratio is indicative of the type and degree of field nonuniformity produced by coils 10a and 10b. For example, when current iya becomes larger and current iyb becomes smaller, then the third ratio becomes more positive and the resulting horizontal deflection field becomes more pincushion shaped.

In accordance with an inventive feature, the ratio currents iya and iyb is controlled to vary dynamically as a function of the position of the spot on the screen for varying the magnitude and sense of the third ratio. Varying the third ratio changes the degree and type, of the nonuniformity or astigmatism of the total horizontal rate deflection field produced by coils 10a and 10b. By varying the third ratio, the horizontal deflection field can be made more or less pincushion shaped or more or less barrel shaped as a function of the spot position, in a manner to provide dynamic, electron beam lensing action. The modulation of currents iya and iyb provides the beneficial lensing action that controls the shape of the beam spot in a manner analogous to that explained with respect to the circuit of FIG. 2.

Variation of the ratio between the magnitudes of currents iya and iyb of FIG. 9 is accomplished by modulation circuits of horizontal deflection circuit 178', not shown in detail. Circuit 178' amplitude modulates, at a vertical rate, each of currents iya and iyb, in accordance with corresponding waveforms 178a and 178b, respectively. Each of currents iya and iyb may be modulated in a manner similar to that accomplished in a conventional side pincushion distortion correction circuit. The modulating waveforms, 178a and 178b, may be waveforms at the vertical rate. Such modulation dynamically varies, as a function of the spot position, the magnitude and sign of the third ratio. Such modulation provides the beneficial lensing action that controls the shape of the beam spot.

Similarly, in the intermediate and exit regions of yoke 55', the winding distribution or angular density of the windings that form coils 99a is made to vary in accordance with a sum of a fundamental harmonic component and of a positive harmonic component at the third harmonic, as defined by the Fourier series expansion. For example, the ratio between a magnitude of a third harmonic component and that of a fundamental harmonic component of the winding distribution of coils 99a is established to be about 200%.

On the other hand, the winding distribution or angular density of the windings that form coils 99b is made to vary in accordance with a sum of a fundamental harmonic component and of a harmonic component at a negative third harmonic, as defined by the Fourier series expansion. For example, the ratio between a magnitude of the harmonic component at the third harmonic and that of the fundamental harmonic component of the winding distribution of coils 99b is established to be about −200%. A vertical deflection circuit 177' produces a vertical deflection current iva in coils 99a and a vertical deflection current ivb in coils 99b. In accordance with an inventive feature, a ratio between the magnitudes of currents iva and ivb that varies as a function of the position of the spot on screen 22 determines whether the combined arrangement of coils 99a and 99b produces a total pincushion or a total barrel shaped vertical deflection field and also the flux density gradient or the degree of field nonuniformity of such vertical deflection field. The ratio between currents iva and ivb varies dynamically to provide dynamic electron beam lensing action. A fourth ratio is defined in a way analogous to the third ratio, as explained before with respect to coils 10a and 10b. The fourth ratio is defined as the ratio between the sum of the third harmonic components and the sum of the fundamental harmonic components associated with 99a and 99b. Dynamic electron beam lensing action is further accomplished by varying the fourth ratio associated with coils 99a and 99b in a way analogous to that explained before with respect to coils 10a and 10b.

In accordance with another inventive feature, the ratio between currents iva and ivb varies dynamically by modulation circuits, not shown in detail, that modulate the amplitude of each of currents iva and ivb, in accordance with corresponding waveforms 177a and 177b, respectively. Each of currents iva and ivb may be modulated in a way similar to that accomplished in a conventional top/bottom pincushion distortion correction circuit. The modulating waveforms 177a and 177b may contain waveform components at the vertical and the horizontal rates.

Figure 10:
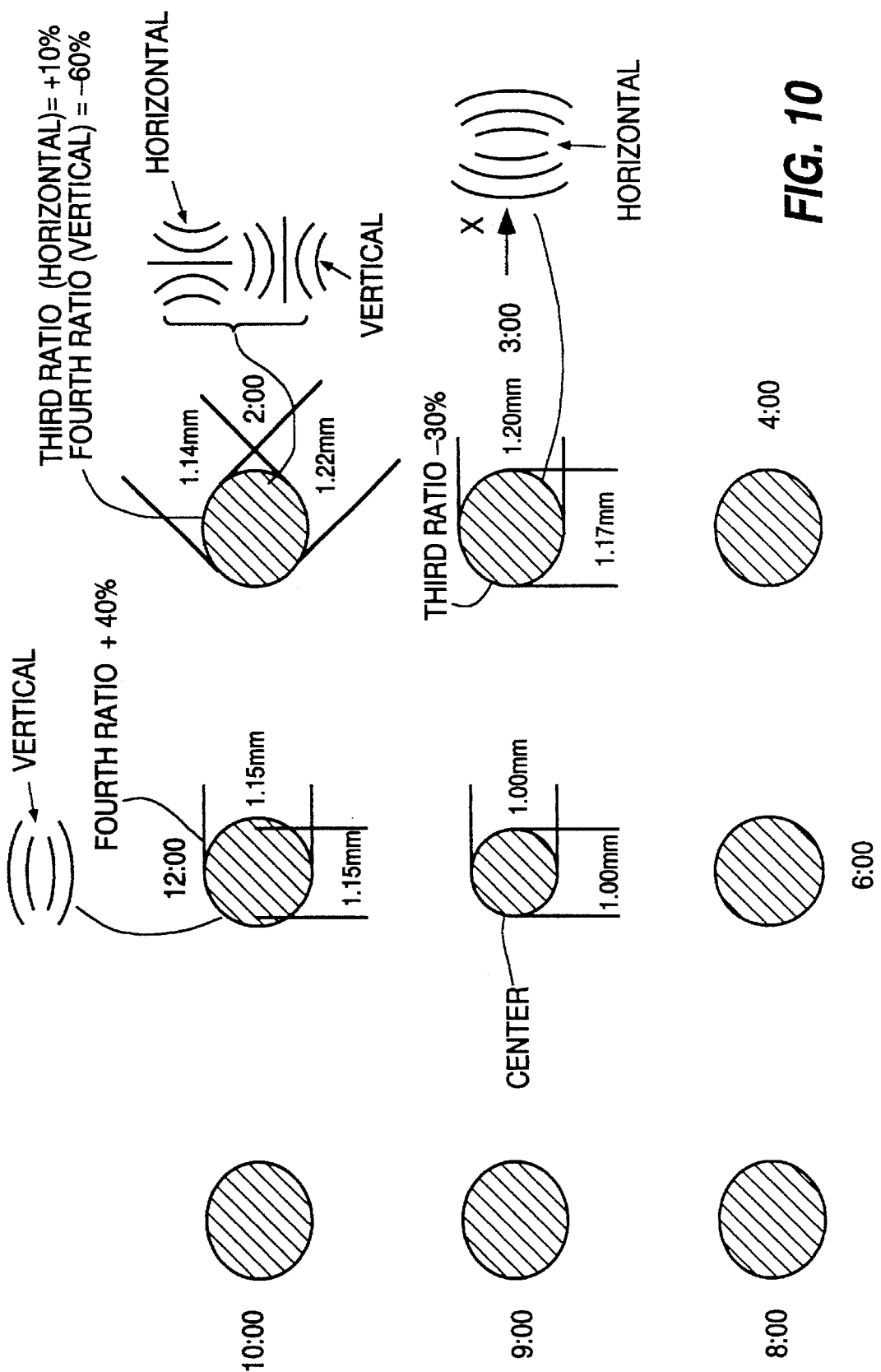
FIG. 10 illustrates the shape of a beam spot at corresponding beam landing locations in a main deflection field produced in the arrangement of FIG. 9.

Advantageously, by dynamically varying the nonuniformity of each of the horizontal and vertical deflection fields in yoke 55', by dynamically varying the nonuniformity of the magnetic field produced by astigmator 24' and by dynamically varying the focus voltage, the beam spot becomes focused, anastigmatic, and round, as shown in FIG. 10. Similar symbols and numerals in FIGS. 1, 2, 3, 4, 5a–5d, 6a–6b and 7a–7e, and 8–10 indicate similar items or functions.

Figure 1:
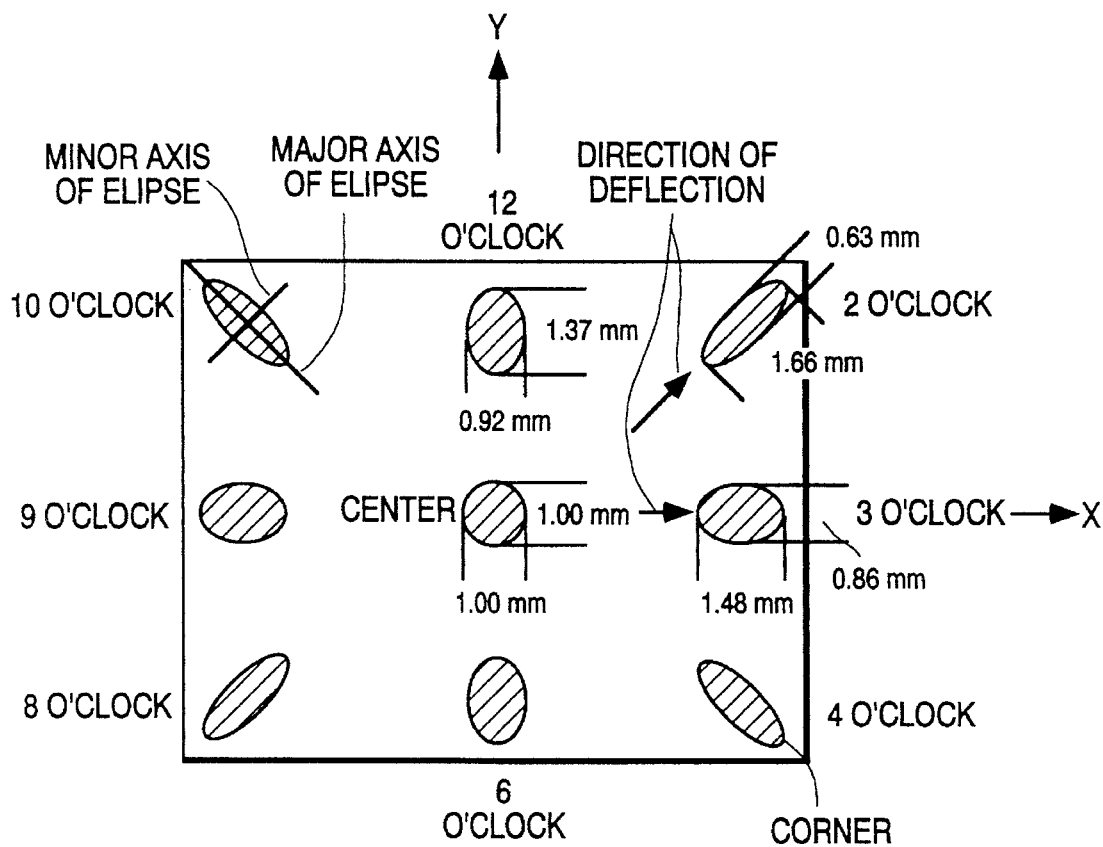
FIG. 1 illustrates a shape of a beam spot at corresponding beam landing locations obtained in a prior art deflection apparatus that utilizes a uniform, main deflection field.

Advantageously, as a result of the beneficial lensing action of yoke 55', variations in the size and in the ellipticity of the spot produced by the arrangement of FIG. 9, as a function of the spot position, as shown in FIG. 10, are substantially smaller from that shown in FIG. 1. As explained before, the spots shown in FIG. 1 are produced by a yoke that produces uniform fields. The ratio between the length of the major axis of the spot at, for example, the 3 o'clock hour point of FIG. 1 to that at the center of the screen is 1.48, indicating a significant increase in the length dimension. In contrast, such ratio in FIG. 10 is only 1.2. The corresponding ratios in FIG. 10 at the 12 and 2 o'clock hour points are 1.15 and 1.22, respectively.

In FIG. 10, at each of, for example, the 12, 2 and 3 o'clock hour points, the ratio between the length of the major axis of the spot to the minor axis of the spot is 1.0, 1.07 and 0.98, respectively. Such ratio is close to unity, indicating a round spot. Whereas, such ratio is equal to or greater than 1.5, in FIG. 1, indicating a highly elongated or distorted spot.

FIG. 10 shows, at each corresponding hour point, the shape of the spot obtained in the arrangement of FIG. 9 and the type of field nonuniformity required for obtaining such round spot. Thus, as in the arrangement of FIG. 2, when the spot is located along axis X or Y of the display screen, the horizontal and vertical deflection fields, respectively, that are required for obtaining such round spot, are each barrel shaped. On the other hand, at the corners of the display screen having a 4:3 aspect ratio, the horizontal and vertical deflection fields that are required for obtaining a round spot, are each pincushion shaped.

The deflection field nonuniformity in the electron beam path at the main deflection region of yoke 55' of FIG. 9 when the spot is at each of the 2, 3 and 12 o'clock hour points that is required for obtaining a spot that is close to being round with only small increase in the major axis of the beam spot upon deflection in the arrangement of FIG. 9 is similar to that required in the arrangement of FIG. 2.

Figure 11:
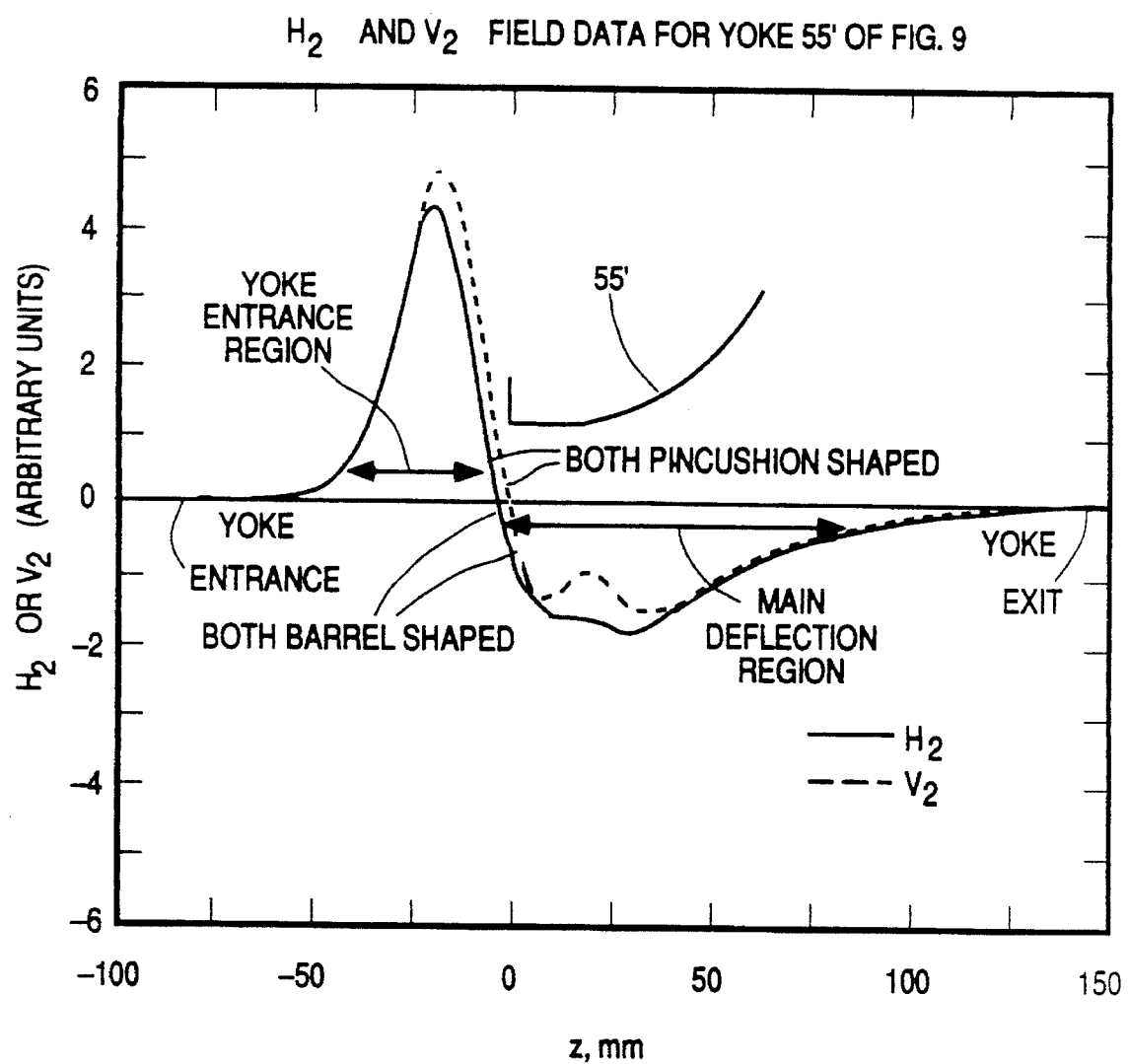
FIG. 11 illustrates deflection field functions, as a function of the position in axis Z, in the deflection yoke of the arrangement of FIG. 9.

FIG. 11 illustrates the field distribution function $H_2$ and $V_2$ at the main deflection region of yoke 55' that are mainly barrel shaped in the arrangement of FIG. 9 required for obtaining an optimal spot when the spot is located at the end of the corresponding axis, X or Y. Similar symbols and numerals in FIGS. 1–4, 5a–5d, 6a–6b, 7a–7e, and 8–11 indicate similar items or functions. Note that at the entrance region of yoke 55' of FIG. 9 both fields are pincushion shaped to provide spot coma correction.

Figure 12A:
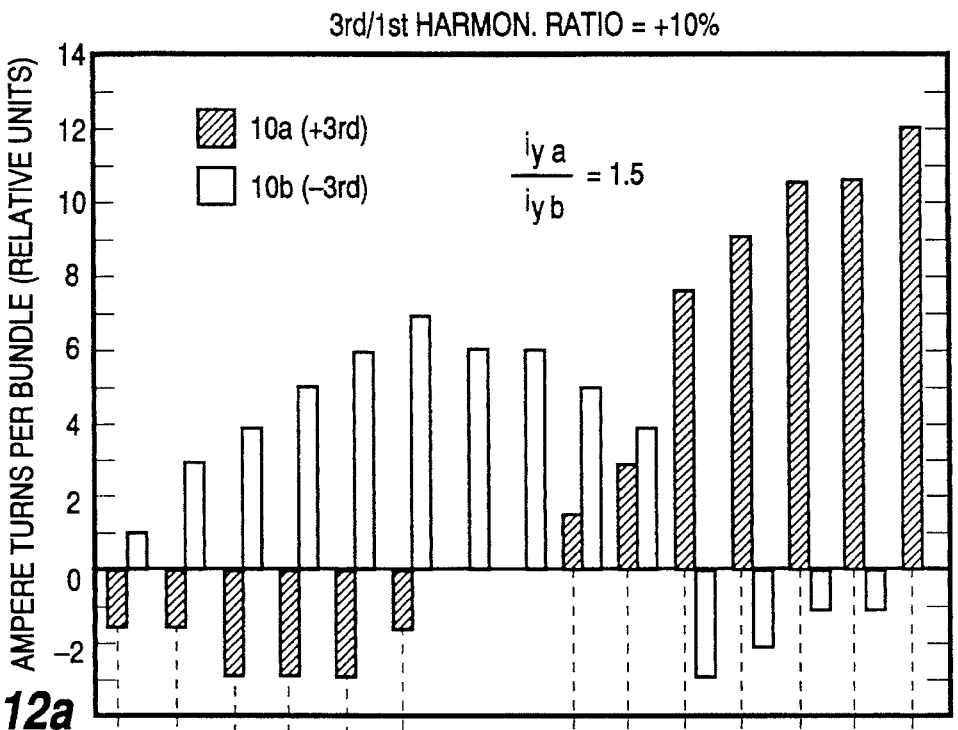
Figure 12B:
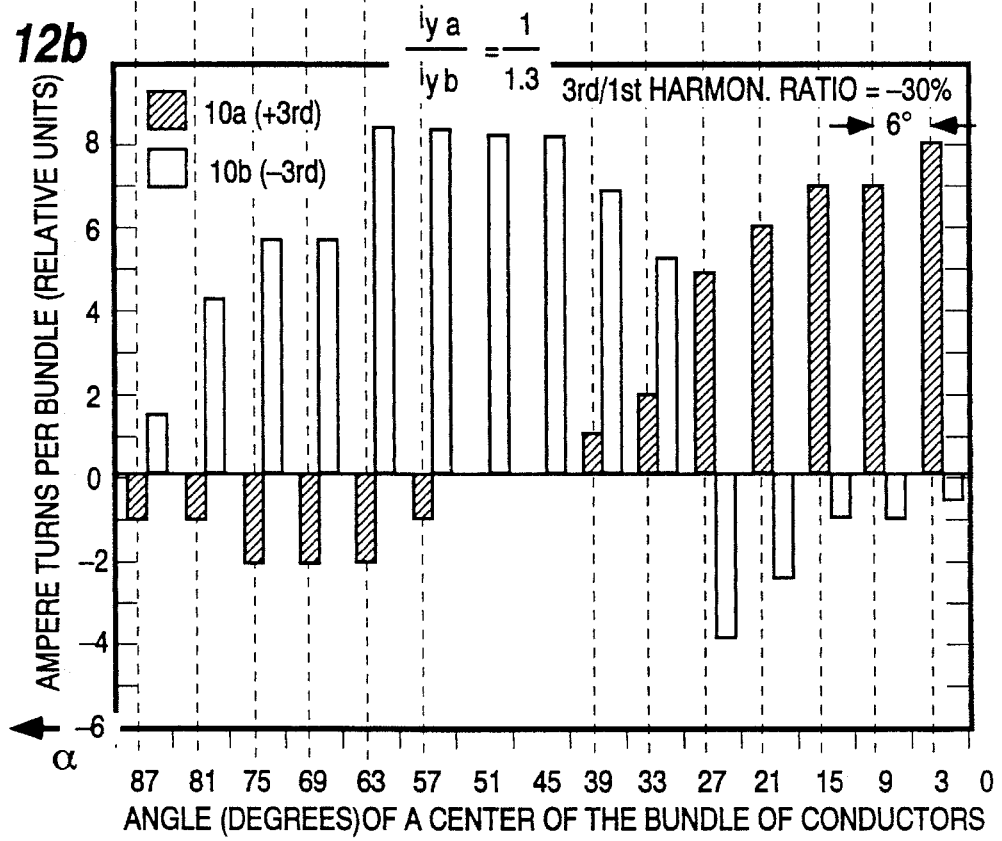

FIG. 12a illustrates the winding-current product distribution of the pair of coils 10a and 10b in the main deflection region of yoke 55' of FIG. 9 required for producing the third ratio at a value of +10% when the spot is at 2 o'clock hour point of FIG. 10. FIG. 12b illustrates winding-current product distribution of coils 10a and 10b required for producing the third ratio at a value of −30% when the spot is at 3 o'clock hour point. FIG. 12c illustrates the winding-current product distribution of the pair of coils 99a and 99b in the main deflection region of yoke 55' of FIG. 9 in a hypothetical example in which the fourth ratio is +60% be required. As indicated before, when the spot is at 12 o'clock hour point the fourth ratio required is only +40%. FIG. 12d illustrates such winding-current product distribution of coils 99a and 99b required for producing the fourth ratio at a value of −60% when the spot is at the 2 o'clock hour point. Similar symbols and numerals in FIGS. 1, 2, 3, 4, 5a–5d, 6a–6b, 7a–7e, 8–11 and 12a–12d indicate similar items of functions. The winding-current product distribution that is provided in the other three quadrants is similar to that in the first quadrant.

The winding-current product distribution is shown in FIGS. 12a–12d as a function of angle α. Each vertical bar in each of FIGS. 12a–12d represents a winding slot of the respective coil having a gross width of 6 degrees in which a bundle of conductor windings of the respective coil are placed. Thus, fifteen slots span a total of 90 degrees of the quadrant. The height of such bar represents the value of winding-current product that is contributed by the respective bundle in the slot of such coil. A black bar represents the winding-current product of a bundle associated with a deflection coil of the pair containing a positive third harmonic; whereas, a white bar represents the winding-current product of a bundle associated with a deflection coil of the pair containing a negative third harmonic.

Horizontal and vertical convergence, and geometry distortion such as East-West or North-South pincushion distortion may be corrected in the arrangements of FIGS. 2 and 9 by well known methods that, for example, do not require the utilization of the harmonic content or field nonuniformity in the deflection yoke for such purpose. For example, in the arrangement of FIG. 2, a video signal processor 222 produces signals R, G and B. Each of signals R, G and B in a given picture frame may be divided into pixel signals that are stored separately in a memory. The time when each individual pixel signal of each of signals R, G and B is read out and applied to the respective cathode of CRT 110 may vary as a function of the spot position in such a manner to eliminate the aforementioned convergence or geometry distortion. An example of a circuit that corrects similar errors by means of varying timings of pixel signals is described in U.S. Pat. No. 4,730,216, in the names of Casey et al., entitled, RASTER DISTORTION CORRECTION CIRCUIT, that is incorporated by reference herein.

Figure 13:
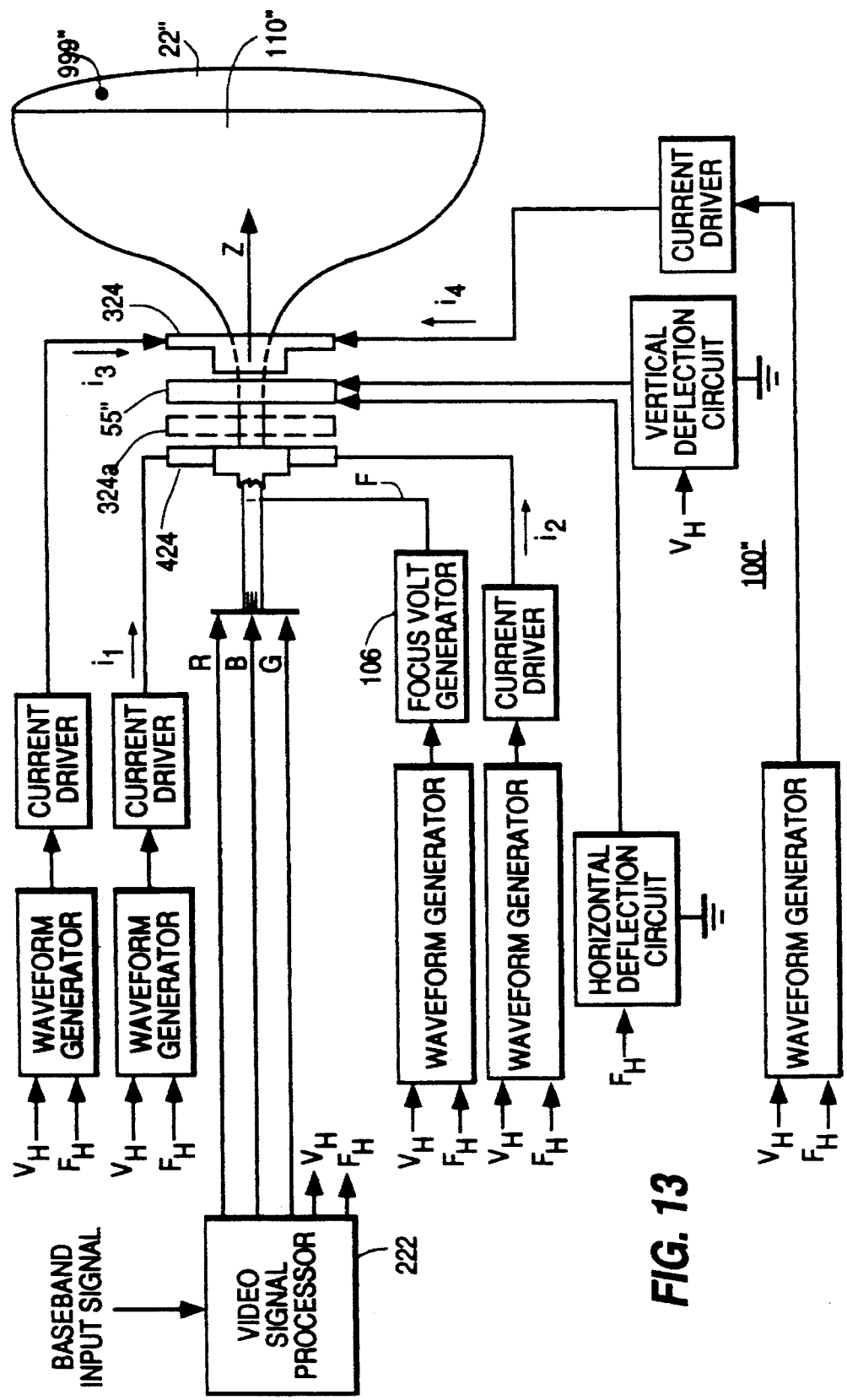
FIG. 13 illustrates a block diagram of a deflection system embodying a further aspect of the invention.

FIG. 13 illustrates a deflection system 100", embodying yet another aspect of the invention. Similar symbols and numerals in FIG. 13 and in FIGS. 1–4, 5a–5d, 6a–6b, 7a–7e, 8– 11 and 12a–12d indicate similar items or functions. Deflection system 100" of FIG. 13 includes a deflection yoke 55" that, unlike, for example, deflection yoke 55 of FIG. 2, may produce uniform horizontal and vertical deflection fields. An electron beam lensing action is produced in the arrangement of FIG. 13 by a pair of quadrupole arrangements 424 and 324 operating in an analogous manner to that of a quadrupole doublet. Each of quadrupole arrangements 424 and 324 may be constructed as a double quadrupole in a similar manner to that of stigmator 24 of FIG. 2.

Arrangement 324 of FIG. 13 is placed coaxially with arrangement 424 along axis Z such that arrangement 324 is closer to display screen 22" than arrangement 424. Arrangement 324 may be placed closer to display screen 22" than deflection yoke 55"; alternatively, instead of arrangement 324, an arrangement 324a that is similar to arrangement 324 may be placed between arrangement 424 and yoke 55", as shown in broken lines.

In another embodiment of the invention, double quadrupole arrangement 324 may be included in yoke 55". Thus, each quadrupole of the double quadrupole may be constructed in a similar way that was discussed before with respect to the quadrupole windings in coils 11 of FIG. 2. The axes of the pair of quadrupoles that form the double quadrupole form an angle of +45°.

Figure 14:
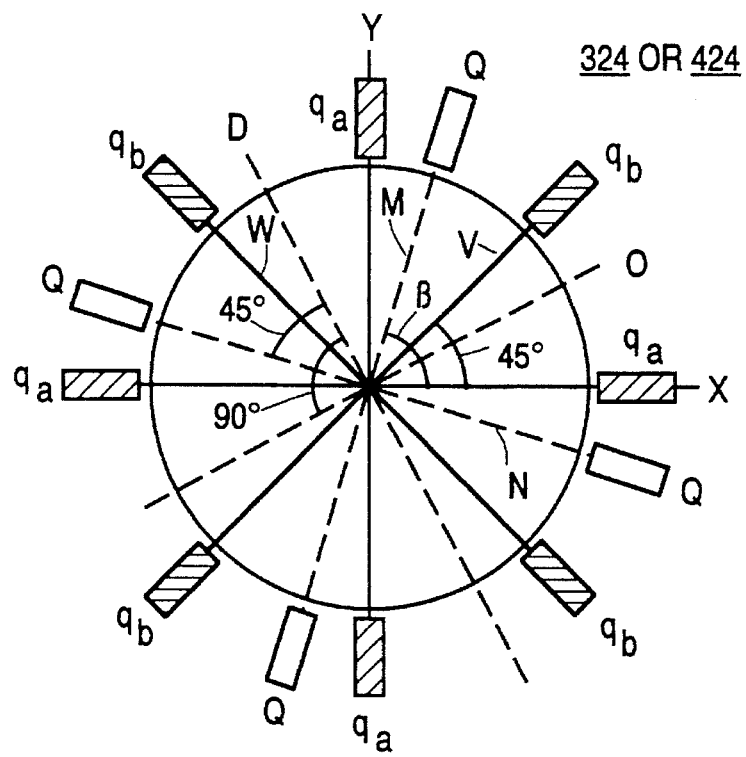
FIG. 14 illustrates a diagram useful for explaining the operation of each double quadrupole arrangement of the arrangement of FIG. 13.

In an embodiment of the invention in which each of arrangement 424 and 324 is constructed as a double quadrupole, each of the pair of double quadrupole arrangements 424 and 324 produces a pair of quadrupole deflection fields. One of the pair of quadrupole fields of each of double quadrupole arrangements 424 and 324 can be represented as formed by four magnetic poles, qa, shown in FIG. 14. Similar symbols and numerals In FIG. 14 and in each of the preceding FIGURES indicate similar items or functions. Poles qa of FIG. 14 are similar to magnetic poles 124 of FIG. 6a. The other one of the pair of quadrupole fields can be represented as formed by four magnetic poles qb of FIG. 14 that are similar to magnetic poles 224 of FIG. 6a. One pair of magnetic poles qa of FIG. 14 lies on axis X. The other pair of magnetic poles qa lies on axis Y. One pair of magnetic poles qb lies on an axis V that forms an angle of +45 degrees with axis X. The other pair of magnetic poles qb lies on an axis W that is perpendicular to axis V.

The quadrupole field produced by magnetic poles qa of double quadrupole arrangement 424 of FIG. 13 is dynamically controlled by a current $i_1$ that is analogous to current ib of FIG. 6a. The quadrupole field produced by magnetic poles qb of FIG. 14 of double quadrupole arrangement 424 of FIG. 13 is dynamically controlled by a current $i_2$ that is analogous to current ia of FIG. 6b.

Currents $i_1$ and $i_2$ that control double quadrupole arrangement 424 of FIG. 13 determine a total quadrupole field that is produced by arrangement 424. Such total quadrupole field is the superposition of the pair of quadrupole fields produced by poles qa and qb. The total quadrupole field of each of arrangements 424 and 324 of FIG. 13 can be represented as formed by four magnetic poles Q of FIG. 14 that define axes M and N. The strength, polarity and orientation of the total quadrupole field that is produced by, for example, arrangement 424 are determined by the magnitudes and polarities of currents $i_1$ and $i_2$. Thus, an angle β between axis M of poles Q and axis X and also the polarity and strength of the total quadrupole field vary as a function of currents $i_1$ and $i_2$ that, in turn, vary as a function of the beam spot landing location. Currents $i_3$ and $i_4$ dynamically control double quadrupole arrangement 324 in an analogous manner to currents $i_1$ and $i_2$, respectively.

The total quadrupole field of each of arrangements 424 and 324 can be represented by corresponding four magnetic poles Q of FIG. 14 having a corresponding diverging axis D at 45 degrees relative to axis N and a corresponding converging axis 0 that is perpendicular to axis D. Axis 0 of FIG. 14 represents the direction in which the corresponding total quadrupole field tends to converge a cross section or profile of the electron beam. An example of how a quadrupole field converges the electron beam profile has been previously explained with respect to FIG. 3. In FIG. 3, axis X, for example, represents such beam converging direction when the beam spot lies on axis X that is analogous to axis 0 of FIG. 14. Axis D of FIG. 14 represents the direction in which the total quadrupole field produced by arrangement 424 of FIG. 13 tends to diverge a profile of the electron beam.

Figure 15:
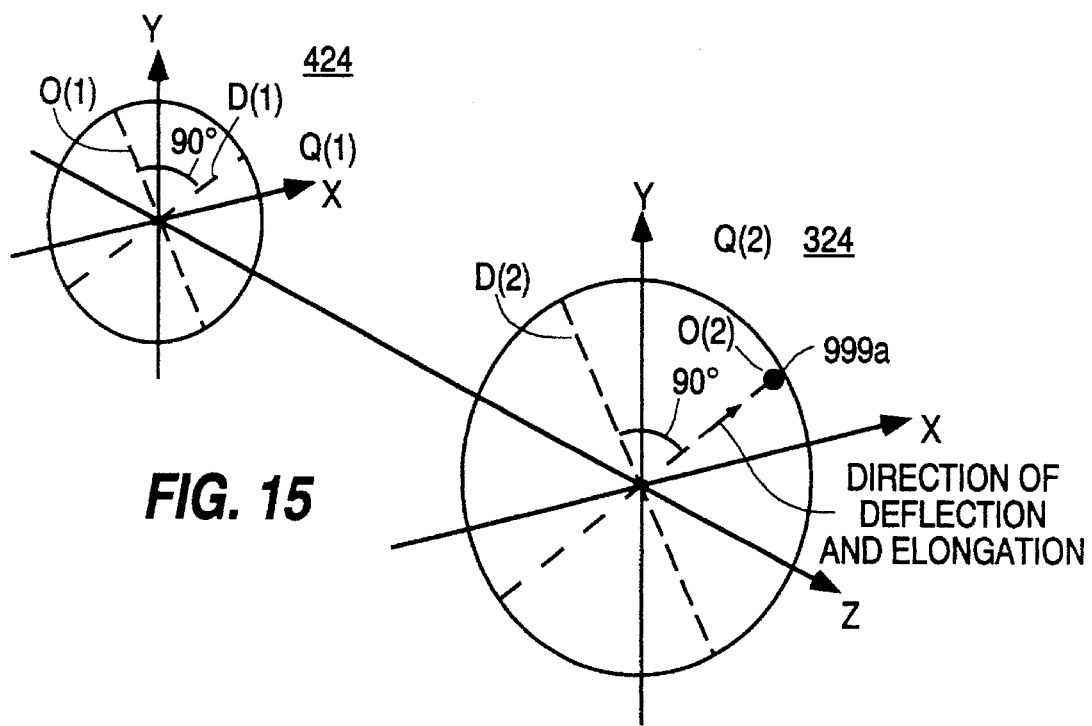
FIG. 15 illustrates a diagram illustrating the operation of a quadrupole doublet formed by a pair of double quadrupoles of the arrangement of FIG. 13.

FIG. 15 illustrates, schematically, the orientation of converging axis 0(1) and of diverging axis D(1) of double quadrupole arrangement 424 relative to the direction of spot elongation. As explained before with respect to FIG. 1, when uniform deflection fields are utilized, the direction of spot elongation and the direction of the deflection are the same. Similarly, the orientation of converging axis 0(2) and of diverging axis D(2) of double quadrupole arrangement 324 is also shown. Thus, FIG. 15 represents the fields produced by the doublet that is formed by arrangements 424 and 324 of FIG. 13. Similar symbols and numerals in FIG. 15 and in each of the preceding FIGURES indicate similar items or functions.

Axes D(1) and 0(1) of FIG. 15 of double quadrupole arrangement 424 of FIG. 13 may be rotated dynamically as a function of the beam spot landing location by varying currents $i_1$ and $i_2$. Similarly, axes D(2) and 0(2) of FIG. 15 of double quadrupole arrangement 324 of FIG. 13 may be rotated dynamically as a function of the beam spot landing location by varying currents $i_3$ and $i_4$.

In accordance with a feature of the invention, currents $i_3$ and $i_4$ of FIG. 13 are controlled in such a manner so as to dynamically rotate the total quadrupole deflection field relative to axis Z of arrangement 324 of FIG. 13 such that converging axis 0(2) of FIG. 15 is maintained dynamically aligned in parallel with the direction of the spot elongation as the direction of the deflection varies. In this way, arrangement 324 of FIG. 13 causes a reduction in spot elongation. The way a profile of the beam spot is converged in the direction of its elongation so as to reduce the spot elongation is similar to that explained before with respect to FIG. 3.

A result of such convergence action in the direction of axis 0(2) is that double quadrupole arrangement 324 of FIG. 13 also diverges the beam spot in the direction D(2) of FIG. 15 that is perpendicular to axis 0(2). The converging-diverging effects of the total quadrupole deflection field produced by arrangement 324 of FIG. 13, advantageously, tends to change beam spot 999 from being significantly elliptic to being substantially less elliptic or closer to being round. The convergence lensing action of arrangement 324 produces spot astigmatism as a result of overconvergence in the direction of spot elongation.

In accordance with another feature of the invention, currents $i_1$ and $i_2$ of FIG. 13 are controlled in such a manner so as to dynamically align diverging axis D(1) of FIG. 15 of arrangement 424 of FIG. 13 in parallel with the direction of spot elongation such that the spot astigmatism caused by, for example, arrangement 324 is reduced. In this way, arrangement 424 produces an increase in the beam aperture angle in the region between arrangements 424 and 324 relative to the beam aperture angle in the region between arrangement 324 and the screen.

The spot diverging operation produced by arrangement 424 of FIG. 13 further from the display screen, in cooperation with the spot converging operation produced by arrangement 324 closer to the display screen, both occurring in the direction of spot elongation, are capable of reducing the spot elongation. This can be explained by a well known theorem derived from the Helmholtz Lagrange law stating that the product of beam aperture angle and spot size is constant. Thus, as explained before, the beam spot diverging action of arrangement 424 produces an increase in the beam aperture angle that results in a reduction of the spot size on screen 22".

Quadrupole coil assembly 28 of FIG. 2 may include an additional pair of saddle coils, not specifically identified in FIG. 2, having an axis that forms a corresponding angle of, for example, 90° with the analogous axis of coils 11 such that assembly 28 forms, for example, a double quadrupole having eight magnetic poles. Such assembly 28 operates similarly to arrangement 324 of FIG. 13.

Figure 16:
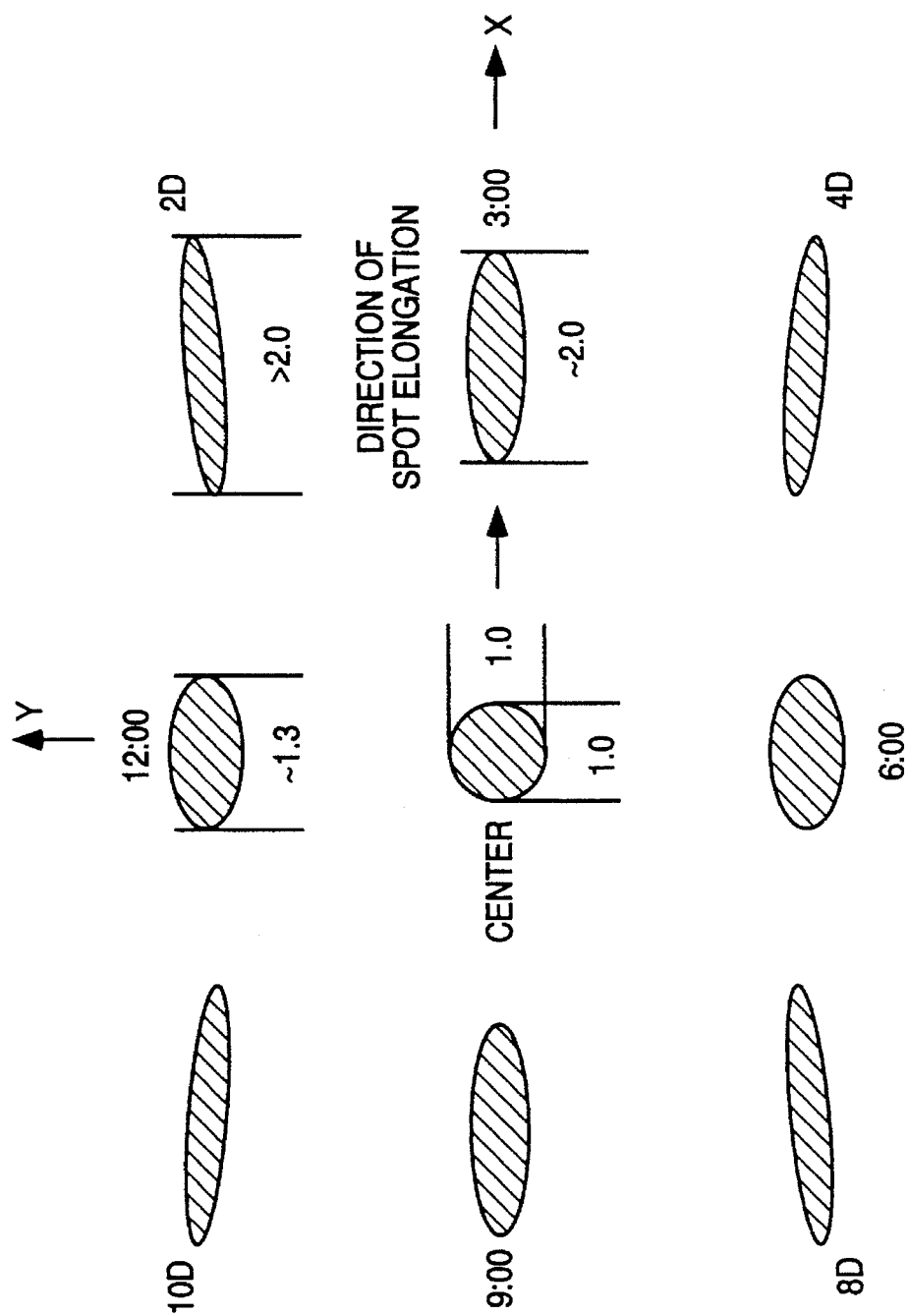
FIG. 16 illustrates a shape of a beam spot at corresponding beam landing locations in a main deflection field that is similar to that produced in a prior art, static self-converged deflection yoke.

Assume that yoke 55" of FIG. 13 is a self-converged yoke. Such self-converged yoke, without the operation of arrangements 324 and 424, would operate similarly to a conventional prior art self-converged system that produces spot elongation mainly in the horizontal direction, as shown in FIG. 16. Similar symbols and numerals in FIG. 16 and in each of the preceding FIGURES indicate similar items or functions. To reduce spot elongation that is mainly in the horizontal direction, each of arrangements 324 and 424 may be constructed as a single quadrupole. Converging axis 0(2) of such single quadrupole arrangement 324 is in the direction of horizontal axis X. Similarly, diverging axis D(1) of single quadrupole arrangement 424 is also in the direction of axis X. The magnetic poles of each such single quadrupole 324 and 424 are oriented relative to axes X and Y in a similar manner to the magnetic poles 224 of FIG. 6b. The beam converging-diverging actions of quadrupole arrangements 324 and 424 of FIG. 13, each being a single quadrupole, reduces spot elongation in the horizontal direction, for similar reasons that were explained before.

Arrangements 324 and 424 have opposite effects on convergence of the beams. Therefore, advantageously, reduction in spot elongation is obtained without significant degradation in 3-beam convergence. The result is that a compromise can be stricken among 3-beam convergence, spot elongation and astigmatism such that spot elongation is reduced relative to the spot elongation obtained in prior art self-converged yoke without significantly sacrificing the selfconvergence property of the deflection system. Another advantage is that since arrangement 324 and 424 operate in opposite directions on a given electron beam, similar waveform generators may be used for energizing quadrupole arrangements 324 and 424.

What is claimed is:

1. A deflection apparatus, comprising:

a cathode ray tube including an evacuated glass envelope, a display screen disposed at one end of said envelope and an electron gun assembly disposed at a second end of said envelope, said electron gun assembly producing an electron beam that forms a beam spot at each of electron beam landing locations on said screen;

a first horizontal deflection coil for producing a first horizontal deflection field and a first vertical deflection coil for producing a first vertical deflection field in a main deflection region of a beam path of said electron beam that varies in a manner to vary the electron beam landing location of said beam spot such that a shape of said beam spot tends to become distorted when said beam spot is at a first beam landing location relative to when said beam spot is at a second beam landing location;

means for producing in a first region of said beam path a first nonuniform field containing a time varying field portion not produced by any of said first horizontal and said first vertical deflection coils, said first nonuniform field producing an electron beam lensing action with respect to a cross section of said electron beam in said first region in a manner that varies in accordance with beam landing location for substantially reducing the tendency of said beam spot to become distorted; and a beam spot stigmator for producing a time varying, second nonuniform field that varies in accordance with beam landing location in a second region of said beam path that is at a different distance from said display screen than said first region, for producing an electron beam lensing action with respect to a corresponding cross section of said electron beam in said second region in a manner that varies in accordance with beam landing location to maintain said beam spot anastigmatic when said beam spot is at each of said first and second beam landing locations.

2. A deflection apparatus according to claim 1 wherein said beam spot tends to become distorted when said beam spot is deflected along one of a diagonal axis, a vertical axis and a horizontal axis of said display screen and wherein said first nonuniform field producing means varies said first nonuniform field in accordance with beam landing location in a manner to reduce the tendency of said beam spot to become distorted when said beam spot is deflected along said one axis.

3. A deflection apparatus according to claim 2 wherein said stigmator maintains said beam spot anastigmatic when said beam spot is deflected along said one axis.

4. A deflection apparatus according to claim 2 wherein said first nonuniform field producing means reduces the tendency of an ellipticity of said beam spot to change and said stigmator maintains said beam spot anastigmatic when said beam spot is deflected along said one axis.

5. An apparatus according to claim 2 wherein said first nonuniform field producing means reduces the tendency of an ellipticity of said beam spot to change and said stigmator maintains said beam spot anastigmatic when said beam spot is deflected along each one of said axes.

6. An apparatus according to claim 1 wherein said horizontal and vertical deflection coils are included in a deflection yoke that further includes a magnetic core, wherein said horizontal and vertical deflection coils are magnetically coupled to said magnetic core, and wherein said first nonuniform field is produced in a third deflection coil of said deflection yoke that is also magnetically coupled to said magnetic core.

7. An apparatus according to claim 1 wherein each of said first and second regions is located outside said horizontal and vertical deflection fields.

8. An apparatus according to claim 1 wherein at least one of said first nonuniform field producing means and said stigmator comprises a quadrupole arrangement.

9. An apparatus according to claim 1 wherein each one of said first nonuniform field producing means and said stigmator comprises a quadrupole arrangement.

10. A deflection apparatus, comprising:

a cathode ray tube including an evacuated glass envelope, a display screen disposed at one end of said envelope and an electron gun assembly disposed at a second end of said envelope, said electron gun assembly producing an electron beam that forms a beam spot at each of electron beam landing locations on said screen;

a plurality of deflection coils including a first horizontal deflection coil for producing a first horizontal deflection field and a first vertical deflection coil for producing a first vertical deflection field in a main deflection region of a beam path of said electron beam that varies in a manner to vary the electron beam landing location of said beam spot such that a shape of said beam spot tends to become distorted when said beam spot is at a first beam landing location relative to when said beam spot is at a second beam landing location, said plurality of deflection coils producing in a first region of said beam path a first nonuniform field containing a time varying field portion, said first nonuniform field producing an electron beam lensing action with respect to a cross section of said electron beam in said first region in a manner that varies in accordance with beam landing location for substantially reducing the tendency of said beam spot to become distorted; and a beam spot stigmator for producing a time varying, second nonuniform field that varies in accordance with beam landing location in a second region of said beam path that is at a different distance from said display screen than said first region, for producing an electron beam lensing action with respect to a corresponding cross section of said electron beam in said second region in a manner that varies in accordance with beam landing location to maintain said beam spot anastigmatic when said beam spot is at each of said first and second beam landing locations.

\* \* \* \* \*